United States Patent
Nave et al.

(10) Patent No.: US 10,106,156 B1
(45) Date of Patent: Oct. 23, 2018

(54) SYSTEMS AND METHODS FOR RECONSTRUCTION OF A VEHICULAR CRASH

(71) Applicant: State Farm Mutual Automobile Insurance Company, Bloomington, IL (US)

(72) Inventors: Cole Nave, Bloomington, IL (US); Nathan Tofte, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/415,633

(22) Filed: Jan. 25, 2017

Related U.S. Application Data

(60) Provisional application No. 62/421,065, filed on Nov. 5, 2016, provisional application No. 62/413,610, filed
(Continued)

(51) Int. Cl.
| | |
|---|---|
| *B60W 30/08* | (2012.01) |
| *B60W 30/09* | (2012.01) |
| *G08G 1/16* | (2006.01) |
| *B60R 21/0134* | (2006.01) |
| *G05D 1/00* | (2006.01) |
| *B60W 10/20* | (2006.01) |
| *B60W 10/184* | (2012.01) |
| *B60W 10/04* | (2006.01) |

(Continued)

(52) U.S. Cl.
CPC ......... *B60W 30/09* (2013.01); *B60R 21/0134* (2013.01); *B60W 10/04* (2013.01); *B60W 10/184* (2013.01); *B60W 10/20* (2013.01); *B60W 10/30* (2013.01); *B60W 30/0956* (2013.01); *B60W 50/0098* (2013.01); *B60W 50/14* (2013.01); *G05D 1/0055* (2013.01); *G05D 1/0088* (2013.01); *G08G 1/16* (2013.01); *B60W 2030/082* (2013.01); *B60W 2540/26* (2013.01); *B60W 2550/00* (2013.01); *B60W 2600/00* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,688,203 B2 | 3/2010 | Rockefeller et al. | |
| 8,954,226 B1 * | 2/2015 | Binion | G06Q 40/08 701/33.4 |

(Continued)

*Primary Examiner* — Lail A Kleinman
(74) *Attorney, Agent, or Firm* — Armstrong Teasdale LLP

(57) ABSTRACT

A system for detecting a vehicular collision (i) receives occupant data from at least one internal sensor; (ii) receives external data from at least one external sensor; (iii) determines positional information for at least one occupant of a vehicle; and (iv) generates a virtual reconstruction of the vehicle collision. The virtual reconstruction indicates a severity of vehicle damage and a severity of injury to the at least one occupant caused by the vehicle collision. The system may also utilized vehicle occupant positional data, and internal and external sensor data to detect potential imminent vehicle collisions, take corrective actions, automatically engage autonomous or semi-autonomous vehicle systems, and/or perform at least one action to reduce a severity of a potential injury.

18 Claims, 11 Drawing Sheets

Related U.S. Application Data on Oct. 27, 2016, provisional application No. 62/402,445, filed on Sep. 30, 2016, provisional application No. 62/359,842, filed on Jul. 8, 2016, provisional application No. 62/332,350, filed on May 5, 2016, provisional application No. 62/328,422, filed on Apr. 27, 2016.

(51) Int. Cl.
*B60W 10/30* (2006.01)
*B60W 30/095* (2012.01)
*B60W 50/00* (2006.01)
*B60W 50/14* (2012.01)

(56) References Cited

U.S. PATENT DOCUMENTS

| | | |
|---|---|---|
| 9,449,495 B1 | 9/2016 | Call et al. |
| 2003/0200123 A1* | 10/2003 | Burge .................... G06Q 10/10 705/4 |
| 2007/0046779 A1 | 3/2007 | Sourlier |
| 2011/0063444 A1 | 3/2011 | Okamoto |
| 2013/0083196 A1 | 4/2013 | Zheng |
| 2013/0317865 A1* | 11/2013 | Tofte ..................... G06Q 10/06 705/4 |
| 2014/0240502 A1 | 8/2014 | Strauss et al. |
| 2014/0278572 A1* | 9/2014 | Mullen ................. G06Q 40/08 705/4 |

\* cited by examiner

SYSTEMS AND METHODS FOR RECONSTRUCTION OF A VEHICULAR CRASH

RELATED APPLICATIONS

This application is related to U.S. Provisional Patent Application No. 62/328,422, filed Apr. 27, 2016, entitled "SYSTEMS AND METHODS FOR RECONSTRUCTION OF A VEHICULAR CRASH," U.S. Provisional Patent Application No. 62/332,350, filed May 5, 2016, entitled "SYSTEMS AND METHODS FOR RECONSTRUCTION OF A VEHICULAR CRASH," U.S. Provisional Patent Application No. 62/359,842, filed Jul. 8, 2016, entitled "SYSTEMS AND METHODS FOR RECONSTRUCTION OF A VEHICULAR CRASH," U.S. Provisional Patent Application No. 62/402,445, filed Sep. 30, 2016, entitled "SYSTEMS AND METHODS FOR RECONSTRUCTION OF A VEHICULAR CRASH," U.S. Provisional Patent Application No. 62/413,610, filed Oct. 27, 2016, entitled "SYSTEMS AND METHODS FOR RECONSTRUCTION OF A VEHICULAR CRASH," and U.S. Provisional Patent Application No. 62/421,065, filed Nov. 11, 2016, entitled "SYSTEMS AND METHODS FOR RECONSTRUCTION OF A VEHICULAR CRASH," the entire contents and disclosures of which are hereby incorporated by reference herein in their entirety.

FIELD OF THE INVENTION

The present disclosure relates to reconstruction of a vehicular crash and, more particularly, to a network-based system and method for reconstructing a vehicular crash or other collision based upon sensor data and determining a severity of the vehicular crash based upon the reconstruction.

BACKGROUND

Due to shock or other factors human perception may be unreliable in a traumatic situation like an accident, especially a vehicular crash. In some cases, some accident victims aren't even aware that they may have sustained injury and cause greater harm to themselves by delaying medical evaluation until their condition has worsened. Furthermore, the human reports of an accident may be inaccurate due to mistake, a desire to shift blame, or in some cases, a desire to overstate the severity of the accident for fraud purposes. Typed or illustrated accident descriptions, usually are created after the fact. In some cases, these reports are created days after the accident. These accident descriptions may include a plurality of errors due to issues with human perception and/or memory. The accident descriptions may be created based upon input from the parties involved in the accident, witnesses to the accident, and first responders at the scene of the accident. It is desired to have a system that accurately records aspects of an accident so that human memory and perception is not the only basis for reconstructing and reporting an accident.

BRIEF SUMMARY

The present embodiments may relate to systems and methods for reconstructing a vehicular crash. An accident monitoring system, as described herein, may include an accident monitoring ("AM") computer device that is in communication with a mobile computer device associated with a user. The AM computer device may be configured to (i) receive sensor data of a vehicular crash from at least one mobile device associated with a user, (a) wherein the at least one mobile device includes at least one of a vehicle computer device associated with the vehicle involved in the vehicular crash, a cellular connected computer device (e.g., a cellphone, a tablet, a wearable device, etc.), and an Internet connected computer device (e.g., a smartphone, a tablet, a wearable device, etc.), (b) wherein the at least one mobile device includes one or more sensors including sensors that may be embedded within the at least one mobile device and/or included within the vehicle for measuring or recording parameters experienced by the vehicle or within the vehicle, and (c) wherein the sensor data is based upon a period of time prior to the vehicular crash and continuing through to a period of time after the vehicular crash and includes at least one of a measurement of at least one of speed, direction rate of acceleration, rate of deceleration, location, position, orientation, and rotation of the vehicle, a measurement of one or more changes to at least one of speed, direction rate of acceleration, rate of deceleration, location, position, orientation, and rotation of the vehicle, a number of occupants in the vehicle, a location of occupants, a position of occupants (i.e., the location and orientation of an occupant's body parts relative to the vehicle), seatbelt sensor data, and seat occupant weight sensor data; (ii) store a database of vehicular crash scenarios based upon past vehicular crashes and sensor data associated with the vehicular crash scenarios; (iii) compare the database of vehicular crash scenarios to the received sensor data; (iv) generate a plurality of scenario models of the vehicular crash based upon the sensor data and the database of vehicular crash scenarios; (v) determine a certainty of each of the plurality of scenario models; (vi) generate the scenario model from the plurality of scenario models based upon the certainty associated with the scenario model; (vii) select one or more emergency services based upon the scenario model and a location of the vehicular crash; (viii) transmit a message to the one or more emergency services based upon the scenario model, wherein the one or more emergency services include at least one of a towing service, an emergency medical service provider, a fire department, a police department, and/or some other emergency responder; (ix) transmit the scenario model to a user computer device associated with the user, where the user may be one of an policyholder, one or more occupants of the vehicle, and/or the emergency service personnel; (x) receive one or more changes to the scenario model from the user computer device; (xi) update the scenario model based upon the one or more changes; (xii) receive a confirmation of the scenario model from the user computer device; (xiii) determine at least one potential injury to an occupant of the vehicle based upon the scenario model, wherein the at least one potential injury may be at least partially determined based upon the location and/or position of the occupant within the vehicle; (xiv) transmit the at least one potential injury to the user computer device; (xv) receive confirmation of the at least one potential injury from the user computer device; (xvi) receive sensor data from a different vehicle involved in the vehicular crash; (xvii) update the scenario model based upon the sensor data from the different vehicle; (xviii) store the scenario model; (xix) update the database of vehicular crash scenarios based upon the stored scenario model; and/or (xx) generate at least one insurance claim form based upon the scenario model. The AM computing device may include additional, less, or alternate functionality, including that discussed elsewhere herein.

At least one advantage of this system is that because the scenario model is based upon actual sensor data during the vehicular crash, the accuracy of the scenario model is greatly increased. This reduces the reliance on potentially faulty human recollection. Furthermore, the use of sensor data allows for quicker generation of the scenario model decreasing the lead time for claim processing. Another advantage of the system is that by providing accurate information about the vehicular crash to emergency personnel, the proper personnel and services may be efficiently routed to the vehicular crash location. This may reduce the chance that an injury may be overlooked, and reduce the time that a vehicular occupant has to wait for emergency services. A further advantage is that the system may be able to predict injuries caused by the accident. Another advantage of the system is reducing potential injuries in a vehicular accident by inducing passengers to reposition and/or change direction of facing. A further advantage is reducing damage to at least one of a vehicle and/or passengers by repositioning the passengers prior to impact.

In one aspect, a computer system for reconstructing a vehicle collision may be provided. The computer system comprising at least one processor in communication with at least one memory device. The at least one processor may be programmed to: (1) receive internal data from at least one internal sensor of a vehicle, the internal data including data from at least one of before, during, and after the vehicle collision; (2) receive external data from at least one external sensor, the external data including data from at least one of before, during, and after the vehicle collision; (3) determine positional information for at least one occupant of a vehicle at least one of before, during, and after the vehicle collision based upon the internal data; and/or (4) generate a virtual reconstruction of the vehicle collision, the virtual reconstruction indicating a severity of vehicle damage and a severity of injury to the at least one occupant caused by the vehicle collision. The computer system may have additional, less, or alternate functionality, including that discussed elsewhere herein.

In another aspect, a computer-based method for reconstructing a vehicle collision may be provided. The method may be implemented on a vehicle computer device including at least one processor in communication with at least one memory device. The method may include: (1) receiving internal data from at least one internal sensor of the vehicle, the internal data including data from at least one of before, during, and after the vehicle collision; (2) receiving external data from at least one external sensor, the external data including data from at least one of before, during, and after the vehicle collision; (3) determining, by the vehicle computer device, positional information for at least one occupant of the vehicle at least one of before, during, and after the vehicle collision based upon the internal data; and/or (4) generating a virtual reconstruction of the vehicle collision, the virtual reconstruction indicating a severity of damage to the vehicle and a severity of injury to the at least one occupant caused by the vehicle collision. The method may include additional, less, or alternate actions, including those discussed elsewhere herein.

In a further aspect, a non-transitory computer-readable storage medium having computer-executable instructions embodied thereon may be provided. When executed by a processor coupled to at least memory device, the computer-executable instructions may cause the processor to: (1) receive internal data from at least one internal sensor of the vehicle, the internal data including data from at least one of before, during, and after the vehicle collision; (2) receive external data from at least one external sensor, the external data including data from at least one of before, during, and after the vehicle collision; (3) determine positional information for at least one occupant of the vehicle at least one of before, during, and after the vehicle collision based upon the internal data; and/or (4) generate a virtual reconstruction of the vehicle collision, the virtual reconstruction indicating a severity of vehicle damage and a severity of injury to the at least one occupant caused by the vehicle collision. The computer-executable instructions may direct additional, less, or alternate functionality, including that discussed elsewhere herein.

In a still further aspect, a computer system for reconstructing a vehicle collision may be provided. The computer system may include at least one processor in communication with at least one memory device, the at least one processor is programmed to: (1) receive internal data from at least one internal sensor mounted on a vehicle, wherein the at least one internal sensor is configured to collect data internal to the vehicle, wherein the internal data includes data from at least one of before, during, and after the vehicle collision, and wherein the internal data is associated with the vehicle interior; (2) receive external data from at least one external sensor mounted on the vehicle, wherein the at least one external sensor is configured to collect data external to the vehicle, wherein the external data includes data from at least one of before, during, and after the vehicle collision, and wherein the external data is associated with the vehicle exterior; (3) determine positional information for at least one occupant of the vehicle at least one of before, during, and after the vehicle collision based upon the internal data; and/or (4) generate a virtual reconstruction of the vehicle collision, the virtual reconstruction indicating a severity of vehicle damage and a severity of injury to the at least one occupant caused by the vehicle collision based upon computer analysis of at least one of (i) the internal data, (ii) the external data, and (iii) the positional information. The computer system may have additional, less, or alternate functionality, including that discussed elsewhere herein.

In another aspect, a computer-based method for reconstructing a vehicle collision may be provided. The method may be implemented on a vehicle computer device including at least one processor in communication with at least one memory device. The method may include: (1) receiving internal data from at least one internal sensor mounted on a vehicle, wherein the at least one internal sensor is configured to collect data internal to the vehicle, wherein the internal data includes data from at least one of before, during, and after the vehicle collision, and wherein the internal data is associated with the vehicle interior; (2) receiving external data from at least one external sensor mounted on the vehicle, wherein the at least one external sensor is configured to collect data external to the vehicle, wherein the external data includes data from at least one of before, during, and after the vehicle collision, and wherein the external data is associated with the vehicle exterior; (3) determining, by the vehicle computer device, positional information for at least one occupant of the vehicle at least one of before, during, and after the vehicle collision based upon the internal data; and/or (4) generating a virtual reconstruction of the vehicle collision, the virtual reconstruction indicating a severity of vehicle damage and a severity of injury to the at least one occupant caused by the vehicle collision based upon computer analysis of at least one of (i) the internal data, (ii) the external data, and (iii) the positional information. The method may include additional, less, or alternate actions, including those discussed elsewhere herein.

In one aspect, a computer system for reconstructing a vehicular crash may be provided. The computer system may include at least one processor (and/or associated transceiver) in communication with at least one memory device. The at least one processor (and/or associated transceiver) may be configured or programmed to: (1) receive sensor data of a vehicular crash from at least one mobile device associated with a user (such as via wireless communication or data transmission over one or more radio links or wireless communication channels); (2) generate a scenario model of the vehicular crash based upon the received sensor data; (3) transmit the scenario model to a user computer device associated with the user (such as via wireless communication or data transmission over one or more radio links or wireless communication channels); (4) receive a confirmation of the scenario model from the user computer device (such as via wireless communication or data transmission over one or more radio links or wireless communication channels); (5) store the scenario model; and/or (6) generate at least one insurance claim form based upon the scenario model to facilitate quickly and accurately processing an insurance claim. The computer system may have additional, less, or alternate functionality, including that discussed elsewhere herein.

In another aspect, a computer-based method for reconstructing a vehicular crash may be provided. The method may be implemented on an accident monitoring ("AM") server that includes at least one processor (and/or associated transceiver) in communication with at least one memory device. The method may include: (1) receiving, at the AM server, sensor data of a vehicular crash from at least one mobile device associated with a user (such as via wireless communication or data transmission over one or more radio links or wireless communication channels); (2) generating, by the AM server, a scenario model of the vehicular crash based upon the received sensor data; (3) transmitting the scenario model to a user computer device associated with the user (such as via wireless communication or data transmission over one or more radio links or wireless communication channels); (4) receiving a confirmation of the scenario model from the user computer device (such as via wireless communication or data transmission over one or more radio links or wireless communication channels); (5) storing, in the memory, the scenario model; and/or (6) generating, by the AM server, at least one insurance claim form based upon the scenario model to facilitate quickly and accurately processing an insurance claim. The computer system may have additional, less, or alternate functionality, including that discussed elsewhere herein.

In yet another aspect, at least one non-transitory computer-readable storage media having computer-executable instructions embodied thereon may be provided. When executed by at least one processor, the computer-executable instructions cause the processor (and/or an associated transceiver) to: (1) receive sensor data of a vehicular crash from at least one mobile device associated with a user (such as via wireless communication or data transmission over one or more radio links or wireless communication channels); (2) generate a scenario model of the vehicular crash based upon the received sensor data; (3) transmit the scenario model to a user computer device associated with the user (such as via wireless communication or data transmission over one or more radio links or wireless communication channels); (4) receive a confirmation of the scenario model from the user computer device (such as via wireless communication or data transmission over one or more radio links or wireless communication channels); (5) store the scenario model; and/or (6) generate at least one insurance claim form based upon the scenario model to facilitate quickly and accurately processing an insurance claim. The computer-executable instructions may direct additional, less, or alternate functionality, including that discussed elsewhere herein.

In one aspect, a computer system for notifying emergency services of a vehicular crash may be provided. The computer system may include at least one processor in communication with at least one memory device. The at least one processor may be configured or programmed to: (1) receive sensor data of a vehicular crash from at least one mobile device associated with a user; (2) generate a scenario model of the vehicular crash based upon the received sensor data; (3) store the scenario model; and/or (4) transmit a message to one or more emergency services based upon the scenario model to facilitate quickly and accurately deploying emergency services to the vehicular crash location. The computer system may have additional, less, or alternate functionality, including that discussed elsewhere herein.

In another aspect, a computer-based method for notifying emergency services of a vehicular crash may be provided. The method may be implemented on an accident monitoring ("AM") server that includes at least one processor in communication with at least one memory device. The method may include: (1) receiving, at the AM server, sensor data of a vehicular crash from at least one mobile device associated with a user; (2) generating, by the AM server, a scenario model of the vehicular crash based upon the received sensor data; (3) storing, in the memory, the scenario model; and/or (4) transmitting a message to one or more emergency services based upon the scenario model to facilitate quickly and accurately deploying emergency services to the vehicular crash location. The method may include additional, less, or alternate actions, including those discussed elsewhere herein.

In yet another aspect, at least one non-transitory computer-readable storage media having computer-executable instructions embodied thereon may be provided. When executed by at least one processor, the computer-executable instructions cause the processor to: (1) receive sensor data of a vehicular crash from at least one mobile device associated with a user; (2) generate a scenario model of the vehicular crash based upon the received sensor data; (3) store the scenario model; and/or (4) transmit a message to one or more emergency services based upon the scenario model to facilitate quickly and accurately deploying emergency services to the vehicular crash location. The computer-executable instructions may direct additional, less, or alternate functionality, including that discussed elsewhere herein.

In still another aspect, a computer system for detecting a vehicular crash may be provided. The computer system may include at least one processor, sensor, and/or transceiver in communication with at least one memory device, the at least one processor, sensor, and/or transceiver. The at least one processor may be programmed to (1) receive data from said at least one sensor; (2) determine that a potential vehicular crash is imminent based upon the received data; and/or (3) transmit one or more high priority packets including a notification that the potential vehicular crash is imminent. The computer system may include additional, less, or alternate functionality, including that discussed elsewhere herein.

In a different aspect, a computer-based method for detecting a vehicular crash may be provided. The method may include (1) receiving data from a sensor; (2) determining that a potential vehicular crash is imminent based upon the received data; and/or (3) transmitting one or more high priority packets including a notification that the potential vehicular crash is imminent. The method may include additional, less, or alternate actions, including those discussed elsewhere herein.

In still another aspect, a computer system for detecting a vehicular crash may be provided. The computer system may include at least one processor, sensor, and/or transceiver in communication with at least one memory device. The at least one processor may be programmed to (1) (locally or remotely) receive occupant data from at least one internal sensor (such as via wired or wireless communication); (2) (locally or remotely) receive external data from at least one external sensor (such as via wired or wireless communication); (3) determine that a potential vehicular crash is imminent based upon the received external data; (4) determine positional information for at least one occupant of a vehicle and/or (5) perform at least one action to reduce a severity of a potential injury to the at least one occupant prior to impact. The computer system may include additional, less, or alternate functionality, including that discussed elsewhere herein.

In a different aspect, a computer-based method for detecting a vehicular crash may be provided. The method may include (1) (locally or remotely) receiving occupant data from at least one internal sensor (such as via wired or wireless communication); (2) (locally or remotely) receiving external data from at least one external sensor (such as via wired or wireless communication); (3) determining that a potential vehicular crash is imminent based upon the received external data; (4) determining positional information for at least one occupant of a vehicle and/or (5) performing at least one action to reduce a severity of a potential injury to the at least one occupant prior to impact. The method may include additional, less, or alternate actions, including those discussed elsewhere herein.

In still another aspect, at least one non-transitory computer-readable storage media having computer-executable instructions embodied thereon may be provided. When executed by at least one processor, the computer-executable instructions cause the processor (and/or an associated transceiver) to: (1) (locally or remotely) receive occupant data from at least one internal sensor (such as via wired or wireless communication); (2) (locally or remotely) receive external data from at least one external sensor (such as via wired or wireless communication); (3) determine that a potential vehicular crash is imminent based upon the received external data; (4) determine positional information for at least one occupant of a vehicle and/or (5) perform at least one action to reduce a severity of a potential injury to the at least one occupant prior to impact. The storage media may include additional, less, or alternate actions, including those discussed elsewhere herein.

In still another aspect, a computer-based method for detecting a vehicular collision and automatically engaging an autonomous vehicle feature is provided. The method is implemented on a vehicle computer device that includes one or more processors, sensors, and/or transceivers in communication with at least one memory device. The method includes, via one or more processors, sensors, and/or transceivers, (1) receiving occupant data from at least one internal sensor, (2) receiving external data from the at least one external sensor, (3) determining by the vehicle computer device that a potential vehicular collision is imminent based upon the received external data, and/or (4) automatically engaging at least one of steering, braking, and acceleration of the vehicle to prevent or mitigate damage caused by the vehicle collision. The method may include additional, less, or alternate autonomous-related actions, including those discussed elsewhere herein.

In one aspect, a computer system for detecting a vehicular crash, and/or selecting an autonomous or semi-autonomous vehicle feature or system to engage to avoid or mitigate the vehicle collision may be provided. The computer system may include one or more processors, sensors, and/or transceivers in communication with at least one memory device. The one or more processors, sensors, and/or transceivers may be programmed to: (1) receive occupant data from at least one internal sensor, the occupant data being generated or collected prior to a vehicle collision; (2) receive external data from the at least one external sensor, the external data being generated or collected prior to the vehicle collision; (3) determine that a potential vehicular crash is imminent based upon the received external data; (4) determine positional information for at least one occupant of a vehicle based upon the occupant data; and/or (5) automatically engage an autonomous or semi-autonomous vehicle feature or system to avoid the vehicle collision or otherwise mitigate vehicle damage and/or occupant injury caused by the vehicle collision. The system may include additional, less, or alternate actions, including those discussed elsewhere herein In another aspect, a computer system for reconstructing a vehicle collision may be provided. The computer system may include one or more processors, sensors, and/or transceivers in communication with at least one memory device. The one or more processors, sensors, and/or transceivers may be programmed or otherwise configured to: (1) receive occupant data from at least one internal sensor, the occupant data being generated or collected before, during, and/or after the vehicle collision, (2) receive external data from the at least one external sensor, the external data being generated or collected before, during, and/or after the vehicle collision, (3) determine positional information for at least one occupant of a vehicle before, during, and/or after the vehicle collision, (4) determine positional information for at least one occupant of the vehicle at least one of before, during, and after the vehicle collision based on the occupant data, and/or (5) generate a virtual reconstruction of the vehicle crash, the virtual reconstruction indicating a severity of vehicle damage and a severity of a potential injury to the at least one occupant caused by the vehicle collision. The system may include additional, less, or alternate actions, including those discussed elsewhere herein.

In a further aspect, a computer-based method for reconstructing a vehicle collision may be provided. The method may be implemented on a vehicle computer device including one or more processors, sensors, and/or transceivers in communication with at least one memory device. The method may include, via the one or more processors, sensors, and/or transceivers: (1) receiving occupant data from at least one internal sensor, the occupant data being generated or collected before, during, and/or after the vehicle collision, (2) receiving external data from the at least one external sensor, the external data being generated or collected before, during, and/or after the vehicle collision, (3) determining, by the vehicle computer device, positional information for at least one occupant of a vehicle before, during, and/or after vehicle collision, (4) determining positional information for at least one occupant of the vehicle at least one of before, during, and after the vehicle collision based on the occupant data, and/or (5) generating a virtual reconstruction of the vehicle collision, the virtual reconstruction indicating a severity of damage to the vehicle and a severity of a potential injury to the at least one occupant caused by the vehicle collision. The method may include additional, less, or alternate actions, including those discussed elsewhere herein In still another aspect, a computer-based method for detecting a vehicular crash and/or selecting an autonomous or semi-autonomous vehicle feature to engage may be provided. The method may be implemented on a vehicle computer device including one or more processors, sensors, and/or transceivers in communication with at least one memory device. The method may include, via the one or more processors, sensors, and/or transceivers: (1) receiving occupant data from at least one internal sensor, (2) receiving external data from the at least one external sensor, (3) determining, by the vehicle computer device, that a potential vehicular crash is imminent based upon the received external data, (4) determining positional information for at least one occupant of the vehicle based on the occupant data, and/or (5) automatically engaging an autonomous or semi-autonomous vehicle feature or system to avoid the vehicle collision or otherwise mitigate damage caused by the vehicle collision. The method may include additional, less, or alternate actions, including those discussed elsewhere herein Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
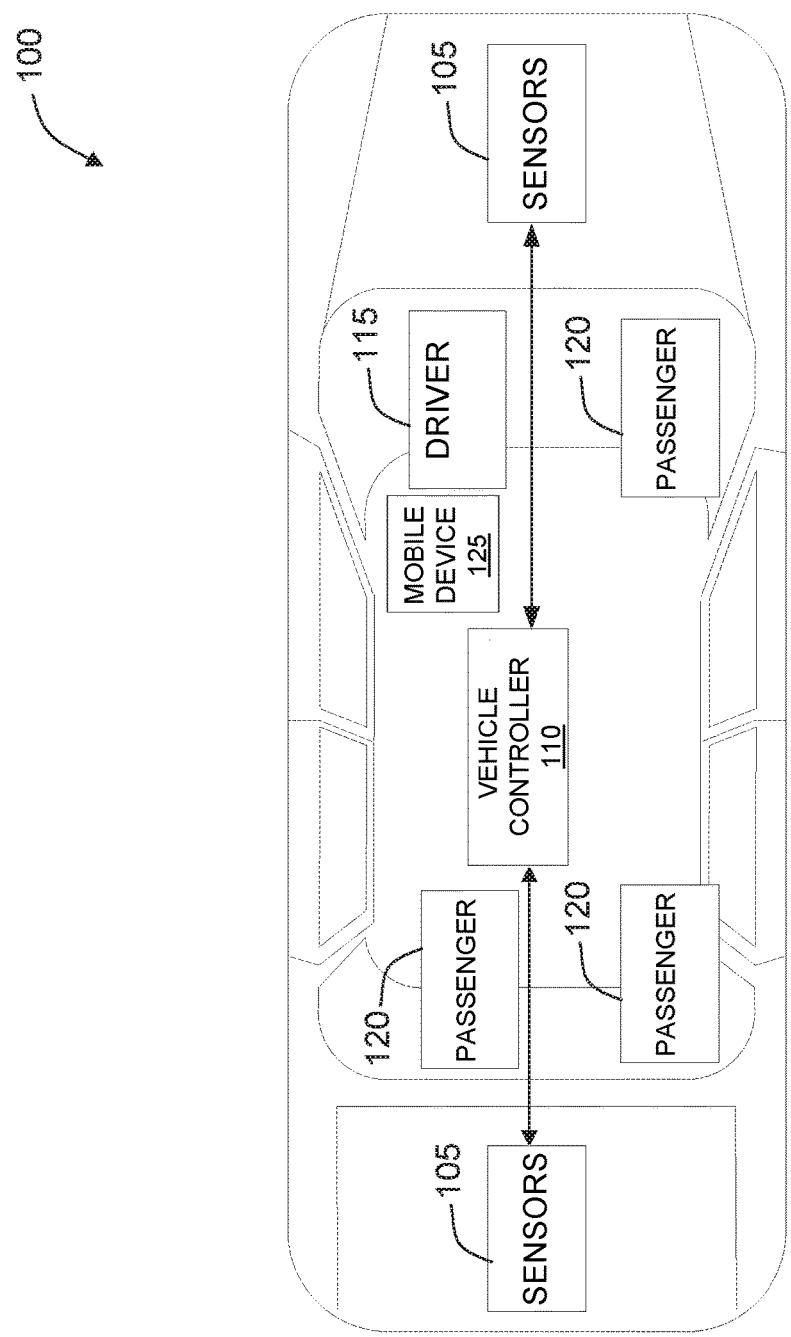
FIG. 1 illustrates a schematic diagram of an exemplary vehicle.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for reconstructing a vehicular crash or other accident based upon sensor data and determining a severity of the vehicular crash based upon the reconstruction. In an exemplary embodiment, the process is performed by an accident monitoring ("AM") computer device, also known as an accident monitoring ("AM") server.

Furthermore, first responders and other emergency personnel may not be aware of the severity of injuries that may have occurred as a result of the accident until they are at the scene. As every minute may count in an emergency, the more information they receive the better that the first responders may prepare for and treat potential injuries.

In one embodiment, the user may have installed an application on a mobile device, such as a smart phone, that allows the mobile device to monitor for accidents and transmit sensor data to the AM server. In another embodiment, the user's vehicle includes a vehicle computer device in communication with one or more sensors for detecting vehicle parameters and/or conditions, also known as sensor data. The vehicle computer device is configured to monitor the sensor data for accidents and transmit the sensor data to the AM server.

In the exemplary embodiment, the AM server may receive sensor data of a vehicular crash from at least one mobile computer device associated with the user (e.g., a cellphone, a tablet, a wearable electronic, or a vehicle computer device). In the example embodiment, the user is an insurance policyholder associated with at least one vehicle that is involved in a vehicular crash or accident. The user may be the driver or a passenger of the vehicle.

In the exemplary embodiment, the mobile computer device receives the sensor data from at least one sensor associated with the mobile computer device. In some embodiments, at least one sensor may be one or more of a plurality of sensors in the vehicle. In other embodiments, the at least one sensor may be an accelerometer, gyroscope, camera, compass, and/or another sensor in the user's smartphone or other mobile device. The at least one sensor may include cabin-facing sensors that may be configured to collect sensor data associated with occupants (i.e., a driver and a passenger) and/or luggage within the vehicle, such as a location and/or a position of the occupants. The location of an occupant may refer to a particular seat or other portion of the vehicle where the occupant is located. The position of an occupant may refer to a body and/or limb orientation of an occupant relative to the vehicle or components of the vehicle, such as a steering wheel, a front portion of the vehicle, and the like. In some embodiments, the sensors may be configured to collect sensor data associated with weight distribution information of the vehicle, occupants, luggage, fuel, and so forth.

In the exemplary embodiment, the sensor data provides information about the vehicular crash. This information includes, but is not limited to, vehicular conditions prior to, during, and after the accident or crash (i.e., speed, acceleration, location, direction of travel, information about surroundings, and operating conditions), forces and directions of forces experienced and/or received during the accident (i.e., changes in speed and direction), information about the occupants of the vehicle (i.e., number, weight, location, position, and seatbelt status), details about the vehicle (i.e., make, model, and mileage), and any actions that the vehicle took during the accident (i.e., airbag deployment). In some embodiments, sensor data may include data for a period of time prior to the vehicular accident and continue through a period of time after the vehicular accident.

In some embodiments, a vehicle controller in the vehicle collects the sensor data from sensors and transmits the sensor data to the AM server. In other embodiments, the user's mobile device transmits its collected sensor data to the AM server. In still other embodiments, the user's mobile device is in communication with the vehicle controller. In these other embodiments, the user's mobile device transmits its collected sensor data to the vehicle controller and the vehicle controller transmits the sensor data from the user's mobile device and from the vehicle's sensors to the AM server.

In the exemplary embodiment, the AM server may generate a scenario model of the vehicular crash based upon the received sensor data. Scenario models may predict damage to the vehicle and injuries that may be experiences by the driver and passengers of the vehicle. In the exemplary embodiment, that AM server may access a database that may contain a plurality of crash scenarios and the sensor data associated with these crash scenarios. The scenarios may be based upon information from vehicle crash testing facilities, from past crashes that that AM server has analyzed, and/or from other sources that allow that AM server to operate as described herein. The AM server may compare the received sensor data with the different stored crash scenarios to generate a scenario model that is the most likely match for the vehicular crash. For example, that AM server may determine that that vehicle was rear-ended by another vehicle that was going approximately 30 miles an hour while that vehicle was stopped.

In some embodiments, that AM server generates a plurality of scenario models that may fit the sensor data received. The AM server may then rank the generated scenarios based upon the likelihood or degree of certainty that the scenario is correct. In some further embodiments, that AM server may compare the degree of certainty to a predetermined threshold.

The AM server may transmit the scenario model to a user computer device associated with user. In some embodiments, the user computer device is associated with the policyholder of an account associated with the vehicle. In other embodiments, the user computer device is associated with one of the occupants of the vehicle. In still other embodiments, the user computer device is associated with a third party, such as one of the emergency service personnel.

The user computer device may then display the scenario model to the user. The user computer device may be configured to receive input from that user about the displayed scenario model. In some embodiments, that user computer device may receive a confirmation from that user that the scenario model is correct. The user computer device may then transmit the confirmation for the scenario model to that AM server.

The AM server may store the scenario model. Based upon the stored scenario model for the vehicular crash, the AM server may generate at least one insurance claim form for the vehicular accident. In the exemplary embodiment, the AM server retrieves one or more stored blank claim forms, such as from a database. The AM server may then populate one or more of the blank fields of the retrieved blank forms based upon the scenario model. Based upon the completeness of the stored scenario model, the AM server may be able to fill out multiple forms and describe the accident in detail. The AM server may also be able to determine one or more damages that the vehicle would have incurred in the vehicular accident. The AM server may also be able to estimate a cost of repairs or replacement.

In some embodiments, the AM server may add the stored scenario model and the associated sensor data to the database to improve the stored models. In these embodiments, the AM server may be executing one or more machine learning algorithms to improve the accuracy of the generating scenario models.

In other embodiments, the user computer device may receive changes and/or updates to the scenario model from the user. The AM server may update the scenario model based upon the updates received from the user.

In some embodiments, the AM server may be able to determine one or more potential injuries to one or more occupants of the vehicle based upon the scenario model. For example, in the rear-end accident example, the AM server may determine that there is a 40% chance that the driver may have incurred a minor neck injury. The AM server may be configured to identify a position of each occupant from the scenario model and determine any potential injuries that may be associated with the identified position. In one example, the AM server determines a front seat passenger is turned around during the crash to protect a child in the back seat of the vehicle. Accordingly, the front seat passenger may have suffered a spinal injury based upon his or her position. The AM server may then transmit the one or more potential injuries to user device for confirmation by the user. Based upon which injuries that the user indicates where incurred, the AM server may then update the scenario model.

In some further embodiments, the AM server may receive sensor data from more than one vehicle involved in the vehicular accident. The AM server may then combine the sensor data from the multiple vehicles to update the scenario model. The AM server may also expand the scenario model for the occupants of each other vehicle involved in the vehicular accident.

In some further embodiments, the AM server may be in communication with one or more emergency services providers, such as a towing service, an emergency medical service provider, a police department, a fire department, and/or some other emergency responder. The AM server may contact one or more of these emergency service providers based upon the scenario model and the location of the vehicular crash. For example, in the rear-end example, the AM server may contact the nearest emergency medical service provider and request immediate deployment for treatment of a potential neck injury. The AM server may also provide other information from the scenario model to the contacted emergency service provider.

In some embodiments, the AM server may determine a severity of the vehicular accident. The determined severity may be based upon a plurality of levels of severity, such as set by government or a standards setting organization. Examples may include, but are not limited to, vehicle damage scale, damage severity code, and injury severity score. The AM server may transmit the determined severity to the one or more emergency services providers. The AM server may also use the determined severity in generating the claim forms.

At least one of the technical problems addressed by this system may include: (i) improving speed and efficiency of processing a claim based upon a vehicular accident; (ii) improving the speed and accuracy of reconstructing a vehicular accident scenario; (iii) properly informing emergency service personnel of the potential injuries associated with a vehicular accident; and/or (iv) determining that a vehicular accident is occurring or may be occurring.

The technical effect achieved by this system may be at least one of: (i) automated reconstruction of a vehicular accident; (ii) automated population of insurance claim forms; (iii) automated contact of emergency service personnel; (iv) providing information about the vehicular accident prior to the arrival of the emergency service personnel on the scene; (v) improved speed of emergency service response to vehicular accidents; and/or (vi) automated detection of vehicular accidents as they are occurring.

The methods and systems described herein may be implemented using computer programming or engineering techniques including computer software, firmware, hardware, or any combination or subset thereof, wherein the technical effects may be achieved by performing at least one of the following steps: (a) receiving, at an accident monitoring ("AM") server, sensor data of a vehicular crash from at least one mobile device associated with a user; (b) generating, by the AM server, a scenario model of the vehicular crash based upon the received sensor data; (c) transmitting the scenario model to a user computer device associated with the user; (d) receiving a confirmation of the scenario model from the user computer device; (e) storing, in the memory, the scenario model; and/or (f) generating, by the AM server, at least one insurance claim form based upon the scenario model to facilitate quickly and accurately processing an insurance claim to facilitate quickly and accurately processing an insurance claim.

Additional technical effects may be achieved by performing at least one of the following steps: (a) receiving, at the AM server, sensor data of a vehicular crash from at least one mobile device associated with a user; (b) generating, by the AM server, a scenario model of the vehicular crash based upon the received sensor data; (c) storing, in the memory, the scenario model; and/or (d) transmitting a message to one or more emergency services based upon the scenario model to facilitate quickly and accurately deploying emergency services to the vehicular crash location.

Further technical effects may be achieved by performing at least one of the following steps: (a) receiving data from a sensor; (b) determining that a potential vehicular crash is imminent based upon the received data; and/or (c) transmitting one or more high priority packets including a notification that the potential vehicular crash is imminent Exemplary Vehicle FIG. 1 depicts a view of an exemplary vehicle 100. In some embodiments, vehicle 100 may be an autonomous or semi-autonomous vehicle capable of fulfilling the transportation capabilities of a traditional automobile or other vehicle. In these embodiments, vehicle 100 may be capable of sensing its environment and navigating without human input. In other embodiments, vehicle 100 is a manual vehicle, such as a traditional automobile that is controlled by a driver 115.

Vehicle 100 may include a plurality of sensors 105 and a vehicle controller 110. The plurality of sensors 105 may detect the current surroundings and location of vehicle 100. Plurality of sensors 105 may include, but are not limited to, radar, LIDAR, Global Positioning System (GPS), video devices, imaging devices, cameras, audio recorders, and computer vision. Plurality of sensors 105 may also include sensors that detect conditions of vehicle 100, such as speed, acceleration, gear, braking, and other conditions related to the operation of vehicle 100, for example: at least one of a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. Furthermore, plurality of sensors 105 may include impact sensors that detect impacts to vehicle 100, including force and direction and sensors that detect actions of vehicle 100, such the deployment of airbags. In some embodiments, plurality of sensors 105 may detect the presence of driver 115 and one or more passengers 120 in vehicle 100. In these embodiments, plurality of sensors 105 may detect the presence of fastened seatbelts, the weight in each seat in vehicle 100, heat signatures, or any other method of detecting information about driver 115 and passengers 120 in vehicle 100.

In some embodiments, plurality of sensors 105 may include sensors for determining weight distribution information of vehicle 100. Weight distribution information may include, but is not limited to, the weight and location of remaining gas, luggage, occupants, and/or other components of vehicle 100. In some embodiments, plurality of sensors 105 may include sensors for determining remaining gas, luggage weight, occupant body weight, and/or other weight distribution information. In certain embodiments, plurality of sensors 105 may include occupant position sensors to determine a location and/or position of each occupant (i.e., driver 115 and passengers 120) in vehicle 100. The location of an occupant may identify a particular seat or other location within vehicle 100 where the occupant is located. The position of the occupant may include the occupant's body orientation, the location of specific limbs, and/or other positional information. In one example, plurality of sensors 105 may include an in-cabin facing camera, LIDAR, radar, weight sensors, accelerometer, gyroscope, compass and/or other types of sensors to identify the location and/or position of occupants within vehicle 100. Vehicle controller 110 and/or another computing device(s) (e.g., mobile device(s)) may be configured to monitor sensor data from plurality of sensors 105 and/or other sensors to determine weight distribution information and/or location and position of the occupants. In one example, vehicle controller 110 may compare sensor data for a particular event (e.g., a road bump) with historical sensor data to identify the weight distribution of vehicle 100 and/or the location of the occupants of vehicle 100. In another example, plurality of sensors 105 may include weight sensors that vehicle controller 110 monitors to determine the weight distribution information.

Vehicle controller 110 may interpret the sensory information to identify appropriate navigation paths, detect threats, and react to conditions. In some embodiments, vehicle controller 110 may be able to communicate with one or more remote computer devices, such as mobile device 125. In the example embodiment, mobile device 125 is associated with driver 115 and includes one or more internal sensors, such as an accelerometer, a gyroscope, and/or a compass. Mobile device 125 may be capable of communicating with vehicle controller 110 wirelessly. In addition, vehicle controller 110 and mobile device may be configured to communicate with computer devices located remotely from vehicle 100.

In some embodiments, vehicle 100 may include autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality. In these embodiments, the autonomous or semi-autonomous vehicle-related functionality or technology may be controlled, operated, and/or in communication with vehicle controller 110.

The wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or backup systems; navigation or GPS-related systems; security and/or anti-hacking measures; and/or theft prevention systems.

While vehicle 100 may be an automobile in the exemplary embodiment, in other embodiments, vehicle 100 may be, but is not limited to, other types of ground craft, aircraft, and watercraft vehicles.

Exemplary Process for Reconstructing a Vehicular Crash

Figure 2:
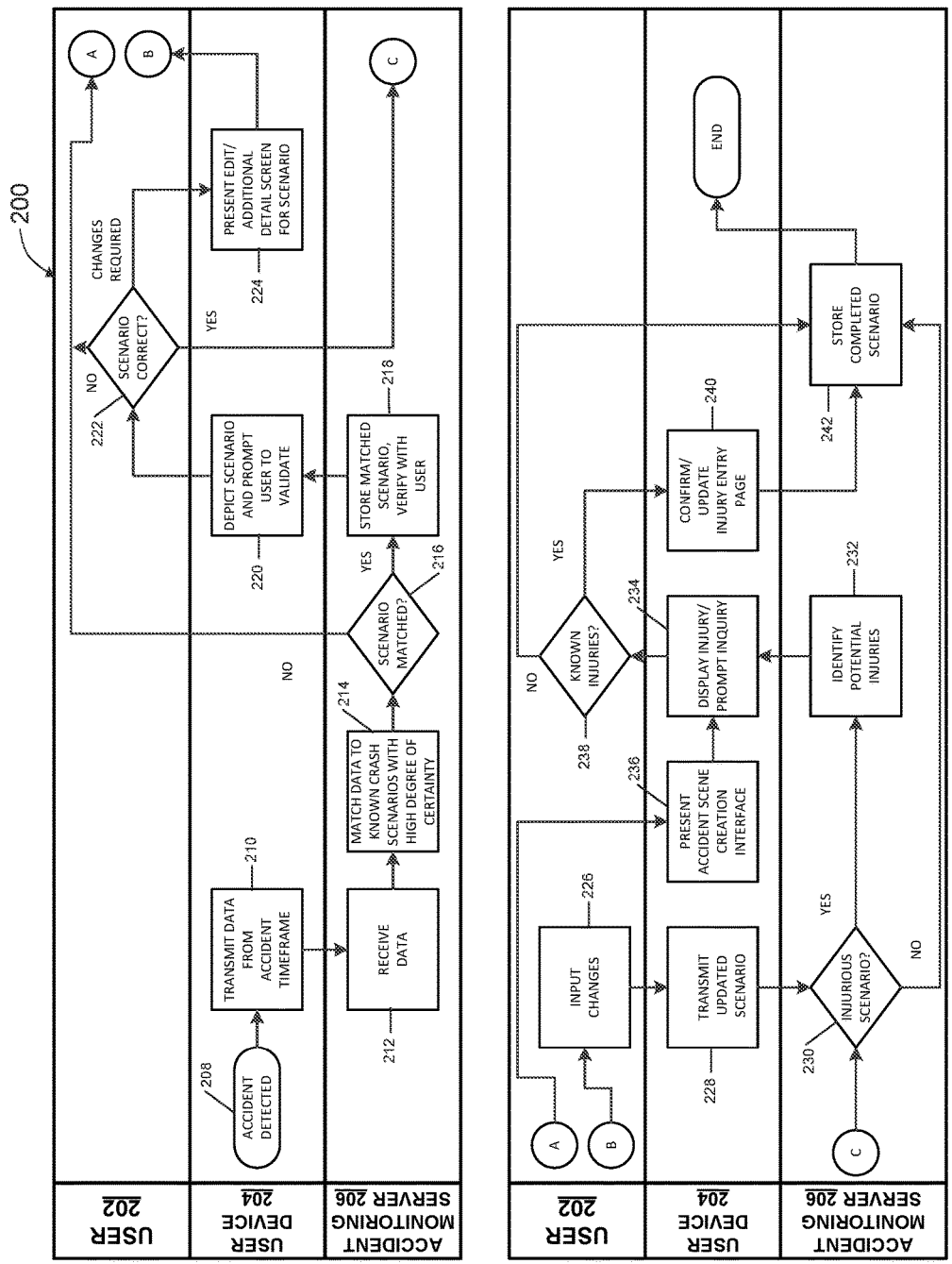
FIG. 2 illustrates a flow chart of an exemplary process of reconstructing a vehicular crash, such as of the vehicle shown in FIG. 1.

FIG. 2 illustrates a flow chart of an exemplary process 200 of reconstructing a vehicular crash, such as of vehicle 100 shown in FIG. 1.

In the exemplary embodiment, a user 202 is associated with a user device 204. In the example embodiment, user 202 may be an insurance policyholder associated with at least one vehicle 100 that is involved in a vehicular crash or accident. In some embodiments, user 202 may be driver 115 or passenger 120 of the at least one vehicle 100. In other embodiments, user 202 may be an emergency responder and/or some other witness to the vehicular crash or accident.

In some embodiments, user device 204 may be mobile device 125 shown in FIG. 1. In these embodiments, user device 204 may be a smart phone, wearable, or other computer device associated with user 202. In other embodiments, mobile device is vehicle controller 100. In still other embodiments, user device 204 may represent more than one computer device associated with user 202. In all embodiments, user device 204 may be capable of displaying information to user 202, receiving input from user 202, and in communication with an accident monitoring ("AM") server 206. User device 204 may include software that allows it to function as is described herein.

In the exemplary embodiment, user device 204 detects 208 an accident or vehicular crash. User device 204 transmits 210 data from an accident timeframe to AM server 206. In some embodiments, user device 204 may transmit 210 the data live while the accident is happening. In other embodiments, user device 204 may transmit 210 the data after the accident. In the exemplary embodiment, user device 204 may transmit 210 stored sensor data from a period before the accident and continues to transmit 210 data for a period of time after the accident.

AM server 206 receives 212 the sensor data. In the exemplary embodiment, AM server 206 may match 214 the data to known vehicular accident scenarios to determine the most appropriate scenario that matches the received sensor data. Based upon the comparison between the sensor data and each the scenarios, AM server 206 ranks the scenarios based upon certainty or likelihood that the scenario is correct. The level or degree of certainty is compared to a threshold, where AM server 206 selects the scenario with the highest degree of certainty that exceeds the threshold. In other embodiments, AM server 206 may model different parts of the accident based upon the available sensor data. For example, AM server 206 may only have partial sensor data and may only be able to recreate a portion of the accident scene. In the example embodiment, AM server 206 may use machine-learning to generate a model of the crash based upon the sensor data and the known vehicular accident scenarios.

In the exemplary embodiment, if AM server 206 matches 216 a scenario, AM server 206 stores 218 the matched scenario and may transmit the matched scenario to user device 204. In this embodiment, user device 204 may be a computer device that is separate from the mobile device that transmitted 210 the sensor data. In this embodiment, separate user device 204 may be registered with AM server 206. AM server 206 may transmit a link to matched scenario to user via an email or application that the user logs into. User device 204 depicts 220 the scenario to user 202 for user 202 to validate. If the scenario is correct 222, then user 202 inputs a confirmation on user device 204 and user device 204 transmits the confirmation to AM server 206. If the scenario is close and just needs changes, then user device 204 presents 224 a screen to allow user 202 to input changes 226 to the scenario. User device 204 transmits 228 the updated scenario to AM server 206. AM server 206 stores the updates. If the scenario was incorrect, user device 204 may present 236 an accident scene creation interface to user 202 that allows user 202 to create the scenario.

If the scenario may have caused an injury 230, AM server 206 identifies 232 potential injuries that may have occurred during the accident based upon the scenario. In some embodiments, the received sensor data may include occupant sensor data that identifies a location and/or a position of one or more occupants. AM server 206 may be configured to identify 232 potential injuries based upon the location and/or position of the occupant (e.g., a front seat passenger facing the back seat during the crash may suffer potential back and spinal injuries). AM server 206 prompts user device 204 to display 234 the identified injuries to user 202 or to inquire if any injuries incurred. If the user knows of any injuries 238, user device 204 confirms or updates 240 the injuries section of the model or scenario and transmits to AM server 206, which updates the scenario. Whether or not there were any injuries, AM server 206 stores 242 the completed scenario.

Exemplary Computer-Implemented Method for Reconstructing a Vehicular Crash

Figure 3:
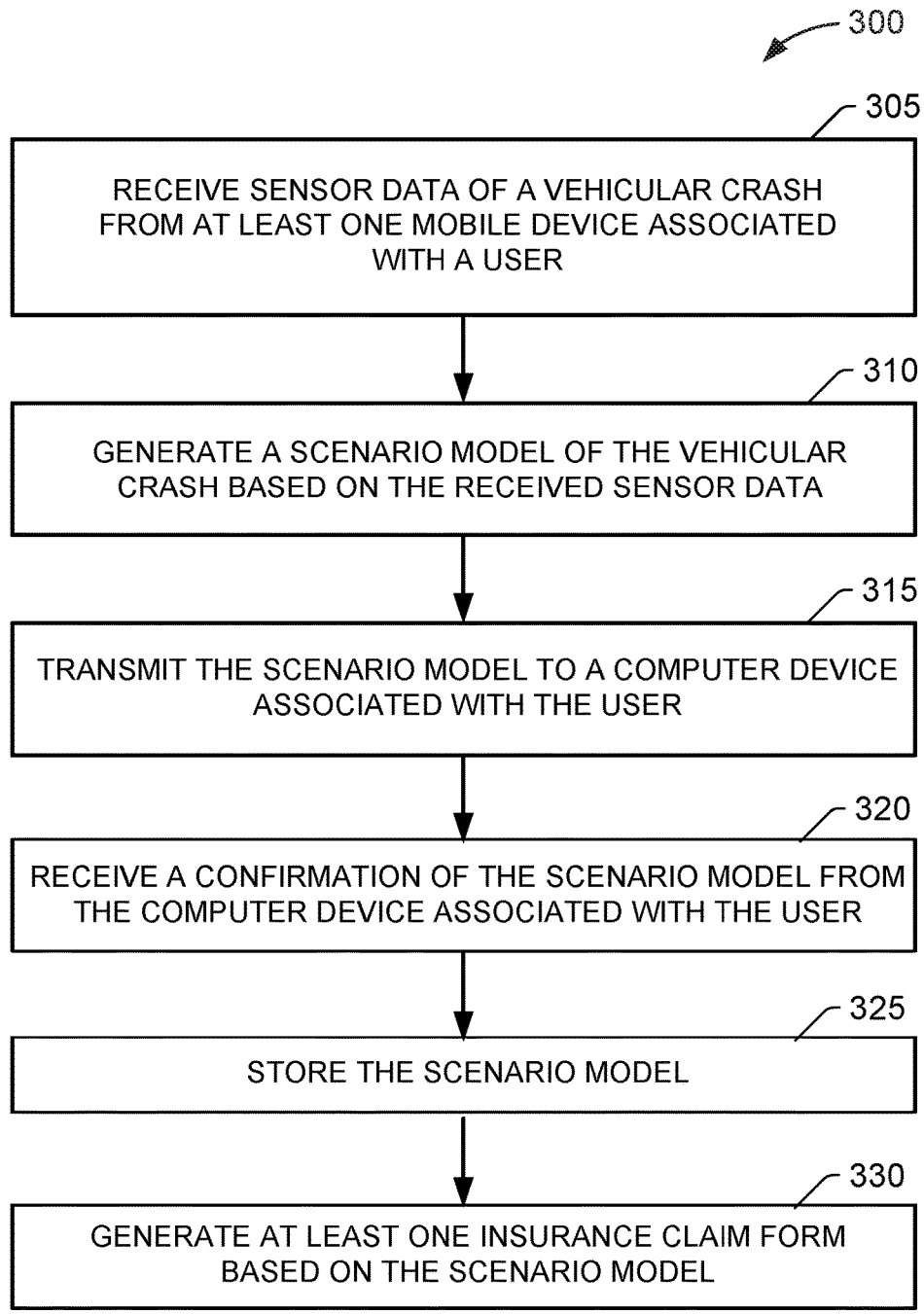
FIG. 3 illustrates a flow chart of an exemplary computer-implemented process for reconstructing a vehicular crash shown in FIG. 2.

FIG. 3 illustrates a flow chart of an exemplary computer implemented process 300 for reconstructing a vehicular crash as shown in FIG. 2. Process 300 may be implemented by a computing device, for example AM server 206 (shown in FIG. 2). In the exemplary embodiment, AM server 206 may be in communication with a mobile computer device 405 (shown in FIG. 4), such as mobile device 125, vehicle controller 110 (both shown in FIG. 1), and user device 204 (shown in FIG. 2).

In the exemplary embodiment, AM server 206 may receive 305 sensor data of a vehicular crash from at least one mobile computer device 405 associated with a user, such as user 202 (shown in FIG. 2). In the exemplary embodiment, user 202 is an insurance policyholder associated with at least one vehicle 100 (shown in FIG. 1) that is involved in a vehicular crash or accident. In some embodiments, mobile computer device 405 may be mobile device 125 shown in FIG. 1. In these embodiments, user device 204 may be a smart phone or other computer device associated with user 202. User 202 may be driver 115 or passenger 120 of vehicle 100.

In the exemplary embodiment, mobile computer device 405 receives the sensor data from at least one sensor 410 associated with mobile computer device 405. In some embodiments, at least one sensor 410 may be one or more of plurality of sensors 105 (shown in FIG. 1) in vehicle 100. In other embodiments, at least one sensor 410 may be an accelerometer or other sensor in mobile device 125. In the exemplary embodiment, the sensor data provides information about the vehicular crash. This information includes, but is not limited to, vehicular conditions prior to, during, and after the accident or crash (i.e., speed, acceleration, location, direction of travel, braking, cornering, information about surroundings, and operating conditions), weight distribution information, forces and directions of forces experienced and/or received during the accident (i.e., changes in speed and direction), information about the occupants of vehicle 100 (i.e., number, weight, location, position, and seatbelt status), details about vehicle 100 (i.e., make, model, and mileage), and any actions that vehicle 100 took during the accident (i.e., airbag deployment). In some embodiments, sensor data may include data for a period of time prior to the vehicular accident and continue through a period of time after the vehicular accident. In some scenarios, where mobile device 125 may be loose in vehicle 100, mobile device 125 may be ejected through a windshield or out through a side window. In these scenarios, AM server 206 may determine that mobile device 125 has left vehicle 100 and is no longer providing data about vehicle 100. In these scenarios, AM server 206 may determine the point that mobile device 125 exited vehicle 100 and not use data from mobile device 125 after that point.

In some embodiments, vehicle controller 110 collects the sensor data from sensors 105 and transmits the sensor data to AM server 206. In other embodiments, mobile device 125 transmits its collected sensor data to AM server 206. In still other embodiments, mobile device 125 is in communication with vehicle controller 110. In these other embodiments, mobile device 125 transmits its collected sensor data to vehicle controller 110 and vehicle controller 110 transmits the sensor data from mobile device 125 and from vehicle's sensors 105 to AM server 206.

In the exemplary embodiment, AM server 206 generates 310 a scenario model of the vehicular crash based upon the received sensor data. Scenario models may predict damage to vehicle 100 and injuries that may be experiences by driver 115 and passengers 120 of vehicle 100. In one embodiment, the received sensor data may include sensor data from occupant position sensors that identify a location and/or a position of each occupant within vehicle 100 prior to or at the time of the vehicular crash. The location and/or position of each occupant may be used to determine what forces were applied to an occupant's joints and skeletal structure during the crash and identify any corresponding potential injuries. For example, a front row passenger 120 turning around to help a child in the back of vehicle 100 may injure his or her back during the vehicular crash because his or her position at impact would not protect his or her body from injury. The sensor data from the occupant position sensors may be combined with data indicating the position of support structures of vehicle 100 (e.g., frame, windows, seats, steering wheel, etc.) to identify any potential injuries that an occupant may have sustained due to the occupant's position relative to the positions of the support structures. In the exemplary embodiment, AM server 206 accesses a database, such as database 420 (shown in FIG. 4). Database 420 may contain a plurality of crash scenarios and the sensor data associated with these crash scenarios. The scenarios may be based upon information from vehicle crash testing facilities, from past crashes that AM server 206 has analyzed, and/or from other sources that allow AM server 206 to operate as described here. AM server 206 compares the received sensor data with the different stored crash scenarios to generate 310 a scenario model that is the most likely match for the vehicular crash. For example, AM server 206 may determine that vehicle 100 was rear-ended by another vehicle that was going approximately 30 miles an hour while vehicle 100 was stopped.

In some embodiments, AM server 206 generates a plurality of scenario models that may fit the sensor data received. AM server 206 may then rank the generated scenarios based upon the likelihood or degree of certainty that the scenario is correct. In some further embodiments, AM server 206 may compare the degree of certainty to a predetermined threshold.

AM server 206 transmits 315 the scenario model to a computer device associated with user 202, such as user device 204. In some embodiments, user device 204 is associated with the policyholder of an account associated with vehicle 100. In other embodiments, user device 204 is associated with one of the occupants of vehicle 100. In still other embodiments, user device 204 is associated with a third party, such as one of the emergency service personnel.

User device 204 may be configured to display the scenario model to user 202. User device 204 may be configured to receive input from user 202 about the displayed scenario model. In some embodiments, user device 204 may receive a confirmation from user 202 that the scenario model is correct. User device 204 may transmit the confirmation for the scenario model to AM server 206 (such as via wireless communication or data transmission over one or more radio frequency links or wireless communication channels). AM server 206 may receive 320 the confirmation.

AM server 206 stores 325 the scenario model. Based upon the stored scenario model for the vehicular crash, AM server 206 generates 330 at least one insurance claim form for the vehicular accident. In the exemplary embodiment, AM server 206 retrieves one or more stored blank claim forms, such as from database 420. AM server 206 may then populate one or more of the blank fields of the retrieved blank forms based upon the scenario model. Based upon the completeness of the stored scenario model, AM server 206 may be able to fill out multiple forms and describe the accident in detail. AM server 206 may also be able to determine one or more damages that vehicle 100 would have incurred in the vehicular accident. AM server 206 may also be able to estimate a cost of repairs or replacement.

In some embodiment, AM server 206 may add the stored scenario model and the associated sensor data to database 420 to improve the stored models. In these embodiments, AM server 206 may be executing one or more machine learning algorithms to improve the accuracy of the generating scenario models.

In other embodiments, user device 204 may receive changes and/or updates to the scenario model from user 202. AM server 206 may update the scenario model based upon the updates received from user 202.

In some embodiments, AM server 206 may be able to determine one or more potential injuries to one or more occupants of the vehicle based upon the scenario model. For example, in the rear-end accident example AM server 206 may determine that there is a 40% chance that driver 115 may have incurred a minor neck injury. In one embodiment, AM server 206 may be configured to determine one or more injuries to the occupants based upon the position of the occupants relative to the vehicle and/or the support structures of the vehicle. AM server 206 may then transmit the one or more potential injuries to user device 204 for confirmation by user 202. Based upon which injuries that user 202 indicates where incurred, AM server 206 then may update the scenario model.

In some further embodiments, AM server 206 may receive sensor data from more than one vehicle involved in the vehicular accident. AM server 206 may then combine the sensor data from the multiple vehicles to update the scenario model. AM server 206 may also expand the scenario model for the occupants of each other vehicle involved in the vehicular accident.

In some further embodiments, AM server 206 may be in communication with one or more emergency services providers, such as a towing service, an emergency medical service provider, a police department, a fire department, and/or some other emergency responder. AM server 206 may contact one or more of these emergency service providers based upon the scenario model and the location of the vehicular crash. For example, in the rear-end example AM server 206 may contact the nearest emergency medical service provider and request immediate deployment for treatment of a potential neck injury on driver 115. AM server 206 may also provide other information from the scenario model to the contacted emergency service provider.

In some embodiments, AM server 206 may determine a severity of the vehicular accident. The determined severity may be based upon a plurality of levels of severity, such as set by government or a standards setting organization. Examples may include, but are not limited to, vehicle damage scale, damage severity code, and injury severity score. AM server 206 may transmit the determined severity to the one or more emergency services providers. AM server 206 may also use the determined severity in generating the claim forms.

In some embodiments, the state of connectivity of each sensor 105 in vehicle 100, each mobile device 125 in vehicle 100, and vehicle controller 110 are tracked by AM server 206. In some embodiments, the state of connectivity is used in validating the data stream. In other embodiments, the state of connectivity is used in determining the severity of the vehicular accident. In these embodiments, AM server 206 determines the extent of trauma required to induce damage to sensor 105, mobile device 125, or vehicle controller 110 severe enough to sever the connection to the corresponding item in relation to the point of impact. For example, if the scenario is for a driver's side impact and a mobile device 125 in driver's pocket is destroyed, then severity is likely level x. Other scenarios may include, but are not limited to, front (left/right) impact and battery connection to ECU severed or head-on impact and Bluetooth module in dashboard destroyed.

Exemplary Computer Network

Figure 4:
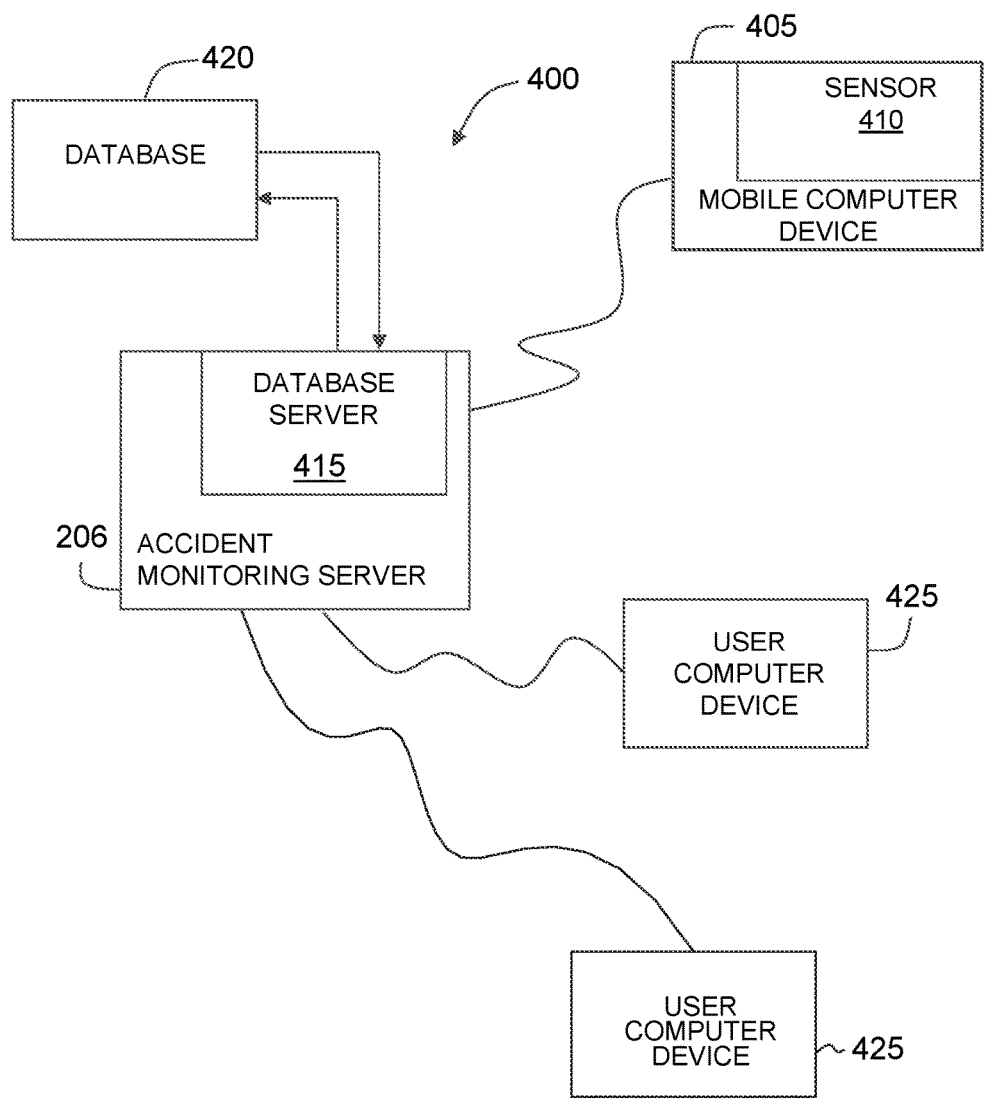
FIG. 4 illustrates a simplified block diagram of an exemplary computer system for implementing the process shown in FIG. 1.

FIG. 4 depicts a simplified block diagram of an exemplary system 400 for implementing process 200 shown in FIG. 2. In the exemplary embodiment, system 400 may be used for reconstructing the vehicular accident based upon sensor data, confirming the scenario with user 202 (shown in FIG. 2), and populating one or more claims forms. As described below in more detail, accident monitoring ("AM") server 206 (shown in FIG. 2) may be configured to receive sensor data of a vehicular crash from at least one mobile device 204 (shown in FIG. 2) associated with user 202, generate a scenario model of the vehicular crash based upon the received sensor data, transmit the scenario model to a computer device associated with user 202, receive a confirmation of the scenario model from the computer device associated with user 202, store the scenario model, and/or generate at least one insurance claim form based upon the scenario model to facilitate quickly and accurately processing an insurance claim.

In the exemplary embodiment, user computer devices 425 are computers that include a web browser or a software application, which enables user computer devices 425 to access AM server 206 using the Internet or other network. More specifically, user computer devices 425 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 425 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 425 is associated with the policyholder of an account associated with vehicle 100. In other embodiments, user computer device 425 is associated with one of the occupants of vehicle 100. In still other embodiments, user computer device 425 is associated with a third party, such as one of the emergency service personnel.

A database server 410 may be communicatively coupled to a database 420 that stores data. In one embodiment, database 420 may include vehicular crash scenarios, sensor data, and/or insurance claim forms. In the exemplary embodiment, database 420 may be stored remotely from AM server 206. In some embodiments, database 420 may be decentralized. In the exemplary embodiment, user 202 may access database 420 via user computer devices 405 by logging onto AM server 206, as described herein.

AM server 206 may be communicatively coupled with the user computer devices 425. In some embodiments, AM server 206 may be associated with, or is part of a computer network associated with an insurance provider, or in communication with the insurance provider's computer network (not shown). In other embodiments, AM server 206 may be associated with a third party and is merely in communication with the insurance provider's computer network.

One or more mobile computer devices 405 may be communicatively coupled with AM server 206 through the Internet or a cellular network. In the exemplary embodiment, mobile computer devices 405 are computers that include a software application, which enables mobile computer devices 405 to access AM server 206 using the Internet or other network. More specifically, mobile computer devices 405 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

Mobile computer devices 405 may also include one or more sensors 410. Mobile computer devices 405 may be configured to receive data from sensors 410 and transmit sensor data to AM server 206. In some embodiments, mobile computer device 405 may be mobile device 125 associated with one of the occupants of vehicle 100. Mobile computer device 405 may be, but is not limited to, a personal digital assistant (PDA), a cellular phone, a smartphone, a tablet, a phablet, wearable electronics, smart watch, or other web-based connectable equipment or mobile devices that allow them to function as described herein. In other embodiments, mobile computer device 405 is vehicle 100, and more specifically, vehicle controller 110 (shown in FIG. 1). In some of these embodiments, vehicle controller 110 is in communication with a second mobile computer device 405, such as a user computer device 425. In these embodiments, vehicle controller 110 may be configured to receive sensor data from user computer device 425 and transmit the sensor data to AM server 206.

In the exemplary embodiment, sensor 410 may be a configured to detect one or more conditions about vehicle 100. For example, sensor 410 may be sensor 105 (shown in FIG. 1). In other embodiments, sensor 410 may be configured to detect one or more conditions of one or more occupants of vehicle 100, such as driver 115 and/or passengers 120 (both shown in FIG. 1).

Exemplary Client Device

Figure 5:
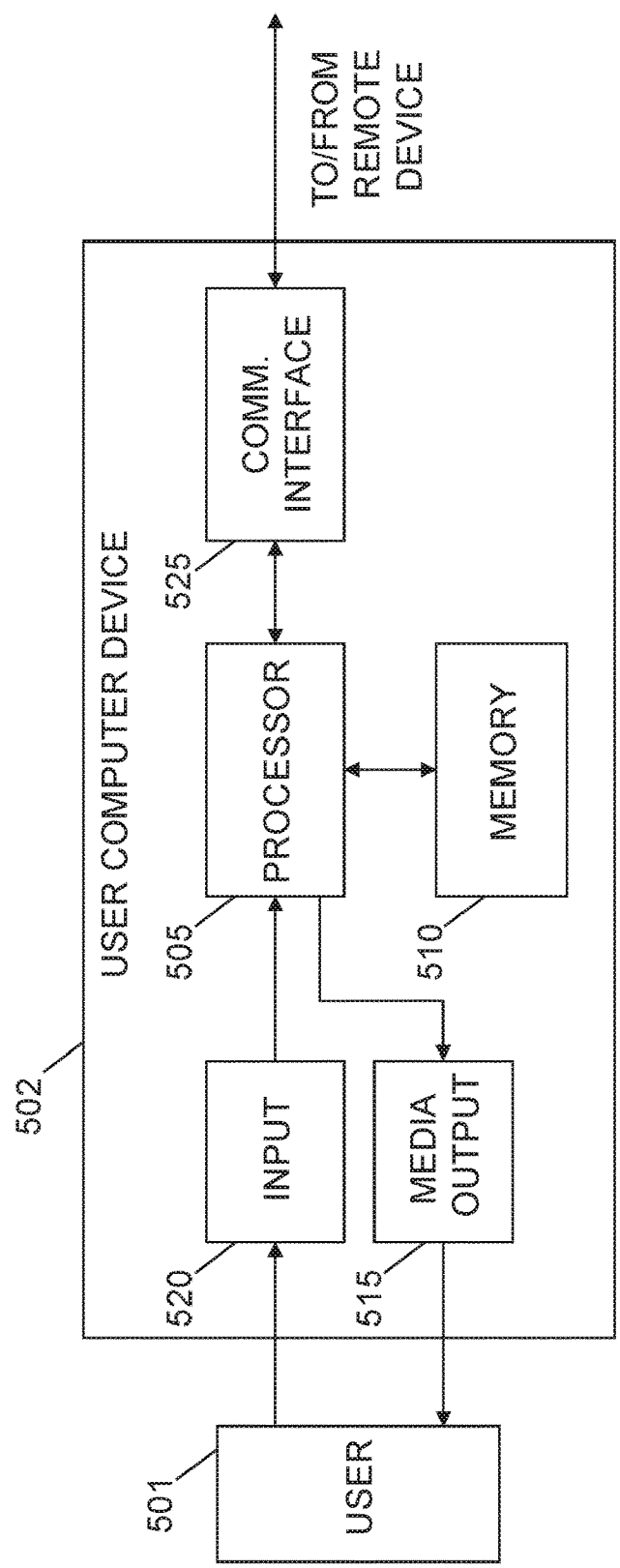
FIG. 5 illustrates an exemplary configuration of a client computer device shown in FIG. 4, in accordance with one embodiment of the present disclosure.

FIG. 5 depicts an exemplary configuration of user computer device 425 shown in FIG. 4, in accordance with one embodiment of the present disclosure. User computer device 502 may be operated by a user 501. In the exemplary embodiment, user 501 may be similar to user 202 (shown in FIG. 2). User computer device 502 may include, but is not limited to, user computer devices 425 (shown in FIG. 4), mobile computer device 405 (shown in FIG. 4), vehicle controller 110 (shown in FIG. 1), mobile device 125 (shown in FIG. 1), and user device 204 (shown in FIG. 2). User computer device 502 may include a processor 505 for executing instructions. In some embodiments, executable instructions are stored in a memory area 510. Processor 505 may include one or more processing units (e.g., in a multi-core configuration). Memory area 510 may be any device allowing information such as executable instructions and/or transaction data to be stored and retrieved. Memory area 510 may include one or more computer readable media.

User computer device 502 may also include at least one media output component 515 for presenting information to user 501. Media output component 515 may be any component capable of conveying information to user 501. In some embodiments, media output component 515 may include an output adapter (not shown) such as a video adapter and/or an audio adapter. An output adapter may be operatively coupled to processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 515 may be configured to present a graphical user interface (e.g., a web browser and/or a client application) to user 501. A graphical user interface may include, for example, an online store interface for viewing and/or purchasing items, and/or a wallet application for managing payment information. In some embodiments, user computer device 502 may include an input device 520 for receiving input from user 501. User 501 may use input device 520 to, without limitation, select and/or enter one or more items to purchase and/or a purchase request, or to access credential information, and/or payment information.

Input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 515 and input device 520.

User computer device 502 may also include a communication interface 525, communicatively coupled to a remote device such as AM server 206 (shown in FIG. 2) or vehicle controller 110. Communication interface 525 may include, for example, a wired or wireless network adapter and/or a wireless data transceiver for use with a mobile telecommunications network.

Stored in memory area 510 are, for example, computer readable instructions for providing a user interface to user 501 via media output component 515 and, optionally, receiving and processing input from input device 520. A user interface may include, among other possibilities, a web browser and/or a client application. Web browsers enable users, such as user 501, to display and interact with media and other information typically embedded on a web page or a website from AM server 206. A client application allows user 501 to interact with, for example, AM server 206. For example, instructions may be stored by a cloud service, and the output of the execution of the instructions sent to the media output component 515.

Figure 8:
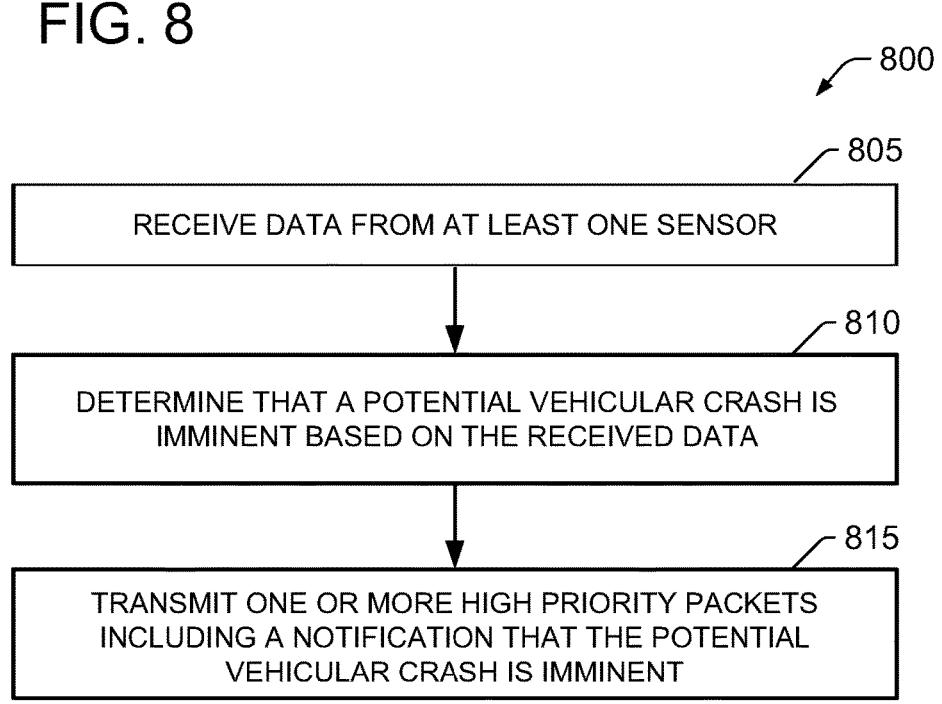
FIG. 8 illustrates a flow chart of an exemplary computer-implemented process of detecting a vehicular crash using the system shown in FIG. 4.

Processor 505 executes computer-executable instructions for implementing aspects of the disclosure. In some embodiments, the processor 505 is transformed into a special purpose microprocessor by executing computer-executable instructions or by otherwise being programmed. For example, the processor 505 may be programmed with the instruction such as illustrated in FIG. 8.

In some embodiments, user computer device 502 may include, or be in communication with, one or more sensors, such as sensor 105 (shown in FIG. 1) and sensor 410 (shown in FIG. 4). User computer device 502 may be configured to receive data from the one or more sensors and store the received data in memory area 510. Furthermore, user computer device 502 may be configured to transmit the sensor data to a remote computer device, such as AM server 206, through communication interface 525.

Exemplary Server Device

Figure 6:
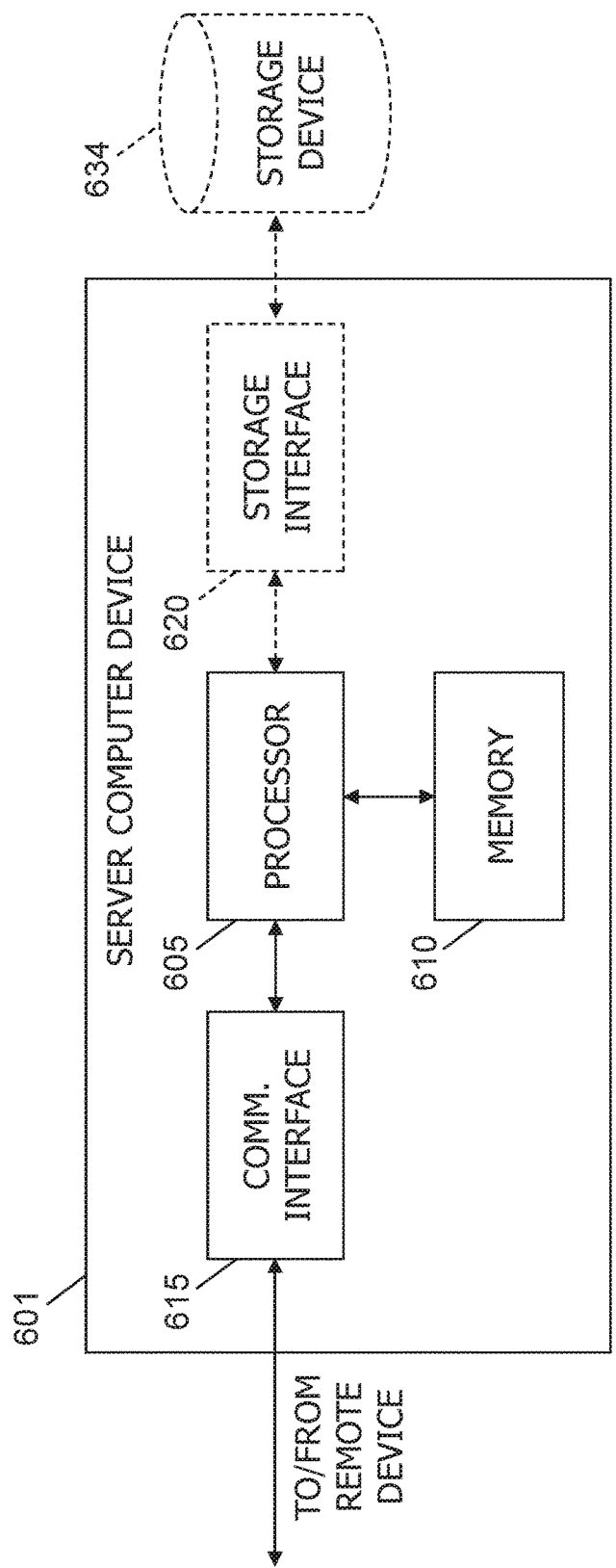
FIG. 6 illustrates an exemplary configuration of a server shown in FIG. 4, in accordance with one embodiment of the present disclosure.

FIG. 6 depicts an exemplary configuration of server 206 shown in FIG. 4, in accordance with one embodiment of the present disclosure. Server computer device 601 may include, but is not limited to, database server 415 (shown in FIG. 4), AM server 206, and vehicle controller 110 (shown in FIG. 1). Server computer device 601 may also include a processor 605 for executing instructions. Instructions may be stored in a memory area 610. Processor 605 may include one or more processing units (e.g., in a multi-core configuration).

Processor 605 may be operatively coupled to a communication interface 615 such that server computer device 601 is capable of communicating with a remote device such as another server computer device 601, mobile device 125 (shown in FIG. 1), mobile computer device 405 (shown in FIG. 4), user computer device 425 (shown in FIG. 4), and AM server 206. For example, communication interface 615 may receive requests from user computer devices 425 via the Internet, as illustrated in FIG. 4.

Processor 605 may also be operatively coupled to a storage device 634. Storage device 634 may be any computer-operated hardware suitable for storing and/or retrieving data, such as, but not limited to, data associated with database 420 (shown in FIG. 4). In some embodiments, storage device 634 may be integrated in server computer device 601. For example, server computer device 601 may include one or more hard disk drives as storage device 634.

In other embodiments, storage device 634 may be external to server computer device 601 and may be accessed by a plurality of server computer devices 601. For example, storage device 634 may include a storage area network (SAN), a network attached storage (NAS) system, and/or multiple storage units such as hard disks and/or solid state disks in a redundant array of inexpensive disks (RAID) configuration.

In some embodiments, processor 605 may be operatively coupled to storage device 634 via a storage interface 620. Storage interface 620 may be any component capable of providing processor 605 with access to storage device 634. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 634.

Processor 605 may execute computer-executable instructions for implementing aspects of the disclosure. In some embodiments, the processor 605 may be transformed into a special purpose microprocessor by executing computer-executable instructions or by otherwise being programmed. For example, the processor 605 may be programmed with the instruction such as illustrated in FIGS. 3 and 7.

Figure 7:
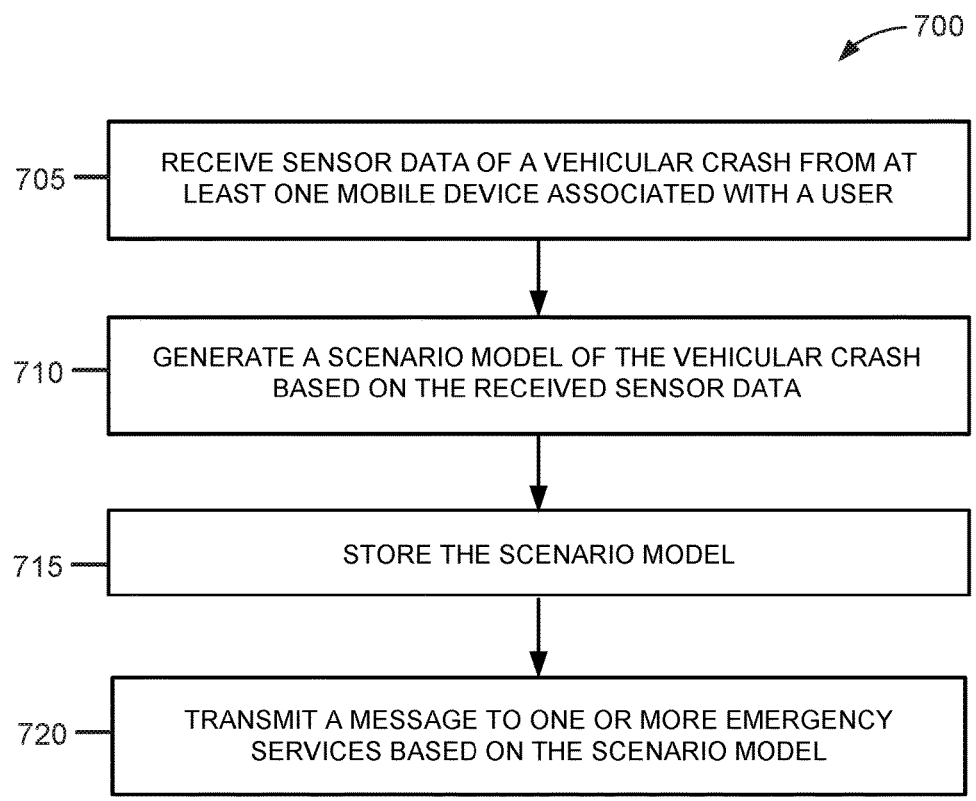
FIG. 7 illustrates a flow chart of an exemplary computer-implemented process of notifying emergency services of a vehicular crash using the system shown in FIG. 4.

Exemplary Computer-Implemented Method for Notifying Emergency Services of a Vehicular Crash FIG. 7 illustrates a flow chart of an exemplary computer implemented process 700 for notifying emergency services of a vehicular crash using system 400 shown in FIG. 4. Process 700 may be implemented by a computing device, for example AM server 206 (shown in FIG. 2). In the exemplary embodiment, AM server 206 may be in communication with a mobile computer device 405 (shown in FIG. 4), such as mobile device 125, vehicle controller 110 (both shown in FIG. 1), and user device 204 (shown in FIG. 2).

In the exemplary embodiment, AM server 206 may receive 705 sensor data of a vehicular crash from at least one mobile computer device 405 associated with a user, such as user 202 (shown in FIG. 2). In the example embodiment, user 202 is an insurance policyholder associated with at least one vehicle 100 (shown in FIG. 1) that is involved in a vehicular crash or accident. In some embodiments, mobile computer device 405 may be mobile device 125 shown in FIG. 1. In these embodiments, user device 204 may be a smart phone or other computer device associated with user 202. User 202 may be driver 115 or passenger 120 of vehicle 100.

In the exemplary embodiment, mobile computer device 405 receives the sensor data from at least one sensor 410 associated with mobile computer device 405. In some embodiments, at least one sensor may be one or more of plurality of sensors 105 (shown in FIG. 1) in vehicle 100. In other embodiments, at least one sensor 410 may be an accelerometer, gyroscope, compass, or other sensor in mobile device 125. In the exemplary embodiment, the sensor data provides information about the vehicular crash. This information includes, but is not limited to, vehicular conditions prior to, during, and after the accident or crash (i.e., speed, acceleration, location, direction of travel, information about surroundings, and operating conditions), weight distribution information, forces and directions of forces experienced and/or received during the accident (i.e., changes in speed and direction), information about the occupants of vehicle 100 (i.e., number, weight, location, position, and seatbelt status), details about vehicle 100 (i.e., make, model, and mileage), and any actions that vehicle 100 took during the accident (i.e., airbag deployment). In some embodiments, sensor data may include data for a period of time prior to the vehicular accident and continue through a period of time after the vehicular accident.

In some embodiments, vehicle controller 110 collects the sensor data from sensors 105 and transmits the sensor data to AM server 206. In other embodiments, mobile device 125 transmits its collected sensor data to AM server 206. In still other embodiments, mobile device 125 is in communication with vehicle controller 110. In these other embodiments, mobile device 125 transmits its collected sensor data to vehicle controller 110 and vehicle controller 110 transmits the sensor data from mobile device 125 and from vehicle's sensors 105 to AM server 206.

In the exemplary embodiment, AM server 206 generates 710 a scenario model of the vehicular crash based upon the received sensor data. In the exemplary embodiment, AM server 206 accesses a database, such as database 420 (shown in FIG. 4). Database 420 may contain a plurality of crash scenarios and the sensor data associated with these crash scenarios. The scenarios may be based upon information from vehicle crash testing facilities, from past crashes that AM server 206 has analyzed, and/or from other sources that allow AM server 206 to operate as described herein. AM server 206 compares the received sensor data with the different stored crash scenarios to generate 710 a scenario model that is the most likely match for the vehicular crash. For example, AM server 206 may determine that vehicle 100 was rear-ended by another vehicle that was going approximately 30 miles an hour while vehicle 100 was stopped.

In some embodiments, AM server 206 may generate a plurality of scenario models that may fit the sensor data received. AM server 206 may then rank the generated scenarios based upon the likelihood or degree of certainty that the scenario is correct. In some further embodiments, AM server 206 may compare the degree of certainty to a predetermined threshold.

AM server 206 may store 715 the scenario model. In the exemplary embodiment, AM server 206 may be in communication with one or more emergency services providers, such as a towing service, an emergency medical service provider, a police department, a fire department, and/or some other emergency responder. AM server 206 may transmit 720 a message about the vehicular accident to one or more of these emergency service providers based upon the scenario model and the location of the vehicular crash. For example, in the rear-end example AM server 206 may contact the nearest emergency medical service provider and request immediate deployment for treatment of a potential neck injury on driver 115. AM server 206 may also provide other information from the scenario model to the contacted emergency service provider.

In some embodiments, AM server 206 may be able to determine one or more potential injuries to one or more occupants of the vehicle based upon the scenario model. For example, in the rear-end accident example AM server 206 may determine that there is a 40% chance that driver 115 may have incurred a minor neck injury. In some embodiments, AM server 206 may determine potential injuries have occurred to an occupant based upon the occupant's position relative to vehicle 100 and/or the support structures of vehicle 100. AM server 206 may then transmit the one or more potential injuries to user device 204 for confirmation by user 202. Based upon which injuries that user 202 indicates where incurred, AM server 206 then may update the scenario model.

In some embodiments, AM server 206 may transmit a message to user 202 that emergency personnel have been contacted and are on their way. The message may further instruct user 202 wait to be checked by emergency personnel. For example, user 202 may feel fine, but since AM server 206 determined there is a chance that user 202 has incurred an injury, AM server 206 may request that user 202 wait to be checked out rather than waving off help.

Based upon the stored scenario model for the vehicular crash, AM server 206 generates 330 at least one insurance claim form for the vehicular accident. In the exemplary embodiment, AM server 206 retrieves one or more stored blank claim forms, such as from database 420. AM server 206 may then populate one or more of the blank fields of the retrieved blank forms based upon the scenario model. Based upon the completeness of the stored scenario model, AM server 206 may be able to fill out multiple forms and describe the accident in detail. AM server 206 may also be able to determine one or more damages that vehicle 100 would have incurred in the vehicular accident. AM server 206 may also be able to estimate a cost of repairs or replacement.

In some embodiment, AM server 206 may add the stored scenario model and the associated sensor data to database 420 to improve the stored models. In these embodiments, AM server 206 may be executing one or more machine learning algorithms to improve the accuracy of the generating scenario models.

In some further embodiments, AM server 206 may receive sensor data from more than one vehicle involved in the vehicular accident. AM server 206 may then combine the sensor data from the multiple vehicles to update the scenario model. AM server 206 may also expand the scenario model for the occupants of each other vehicle involved in the vehicular accident.

In some embodiments, mobile device 125 may be able to determine that it is currently in a pocket of user 202. In these embodiments, AM server 206 may be able to determine the exact amounts of force and directions of force that were exerted on user 202 during the vehicular accident. Based upon this information, AM server 206 may be able to more accurately determine the potential injuries received by user 202 and notify emergency personnel of those potential injuries.

In some embodiments, AM server 206 may determine a severity of the vehicular accident. The determined severity may be based upon a plurality of levels of severity, such as set by government or a standards setting organization. Examples may include, but are not limited to, vehicle damage scale, damage severity code, and injury severity score. AM server 206 may transmit the determined severity to the one or more emergency services providers.

In some embodiments, the state of connectivity of each sensor 105 in vehicle 100, each mobile device 125 in vehicle 100, and vehicle controller 110 are tracked by AM server 206. In some embodiments, the state of connectivity is used in validating the data stream. In other embodiments, the state of connectivity is used in determining the severity of the vehicular accident. In these embodiments, AM server 206 determines the extent of trauma required to induce damage to sensor 105, mobile device 125, or vehicle controller 110 severe enough to sever the connection to the corresponding item in relation to the point of impact. For example, if the scenario is for a driver's side impact and a mobile device 125 in driver's pocket is destroyed, then severity is likely level x. Other scenarios may include, but are not limited to, front (left/right) impact and battery connection to ECU severed or head-on impact and Bluetooth module in dashboard destroyed.

Exemplary Computer-Implemented Method for Detecting a Vehicular Crash

FIG. 8 illustrates a flow chart of an exemplary computer implemented process 800 for detecting a vehicular crash using system 400 shown in FIG. 4. Process 800 may be implemented by a computing device, for example mobile computer device 405 (shown in FIG. 4). In the exemplary embodiment, mobile computer device 125 may be in communication with AM server 206 (shown in FIG. 2). In a first exemplary embodiment, mobile computer device 405 may be vehicle controller 110 in vehicle 100 (both shown in FIG. 1). In a second exemplary embodiment, mobile computer device 405 may be mobile device 125 (shown in FIG. 1).

In the exemplary embodiment, mobile computer device 405 receives 805 data from at least one sensor 410 (shown in FIG. 4). In the first exemplary embodiment, at least one sensor 410 may be one or more of plurality of sensors 105 (shown in FIG. 1) in vehicle 100. In the second exemplary embodiment, the at least one sensor 410 may be an accelerometer in mobile device 125.

Mobile computer device 405 determines 810 that a potential vehicular crash is imminent based upon the received sensor data. For example, in the first exemplary embodiment, sensor 105 is an external sensor and may show that another vehicle is about to collide with vehicle 100. Or sensor 105 may be an impact sensor or any other sensor that allows mobile computer device 405 to work as described herein. In the second exemplary embodiment, mobile device 125 may have been loose in vehicle, such as resting on the dashboard or sitting in a cup holder when the accident occurred. The data from the accelerometer may indicate that mobile device 125 is airborne. Or mobile device 125 may have been in a pocket of driver 115 or passenger 120 (both shown in FIG. 1). The data from accelerometer may indicate that forces on mobile device 125 indicate that an accident may be occurring. In some scenarios, where mobile device 125 may be loose in vehicle 100, mobile device 125 may be ejected through a windshield or out through a side window. In these scenarios, AM server 206 may determine that mobile device 125 has left vehicle 100 and is no longer providing data about vehicle 100. In these scenarios, AM server 206 may determine the point that mobile device 125 exited vehicle 100 and not use data from mobile device 125 after that point.

Mobile computer device 405 transmits 815 one or more high priority packets to AM server 206 indicating that a vehicular crash may be imminent or may be currently occurring. Mobile computer device 405 may instruct communication interface 525 (shown in FIG. 5) to override any current communication to transmit 815 the high priority packets. For example, mobile computer device 405 may transmit 815 the high priority packets to indicate the crash before mobile computer device 405 is rendered inoperable or incapable of transmitting data due to the vehicular accident. In some embodiments, mobile computer device 405 may also transmit at least part of the received sensor data. Mobile computer device 405 may transmit 815 priority data for as long as it is able.

In one exemplary embodiment, the first high priority packet transmitted indicates that a crash is potentially imminent or currently occurring. Based upon that packet, AM server 206 knows to listen for any sensor data or a broadcast of sensor data. Furthermore, the receipt of the high priority packet may be the indication that an accident has been detected 208 (shown in FIG. 2). Any packets that mobile computer device 405 transmits after the first packet may contain sensor data. The first high priority packet may also instruct AM server 206 to not transmit and to only listen for packets. Mobile computer device 405 may be configured to only transmit 815 high priority packets after determining 810 that an accident may be occurring or about to occur. Mobile computer device 405 may also be configured to not allow any other communication channel to be used for a period of time after the accident is detected 208. This restriction may be to allow as much sensor data to be uploaded as quickly as possible. After a period of time, mobile computer device 405 may allow other communications to be placed, such as phone calls to emergency services.

Exemplary Vehicular Crash Detection

Figure 9:
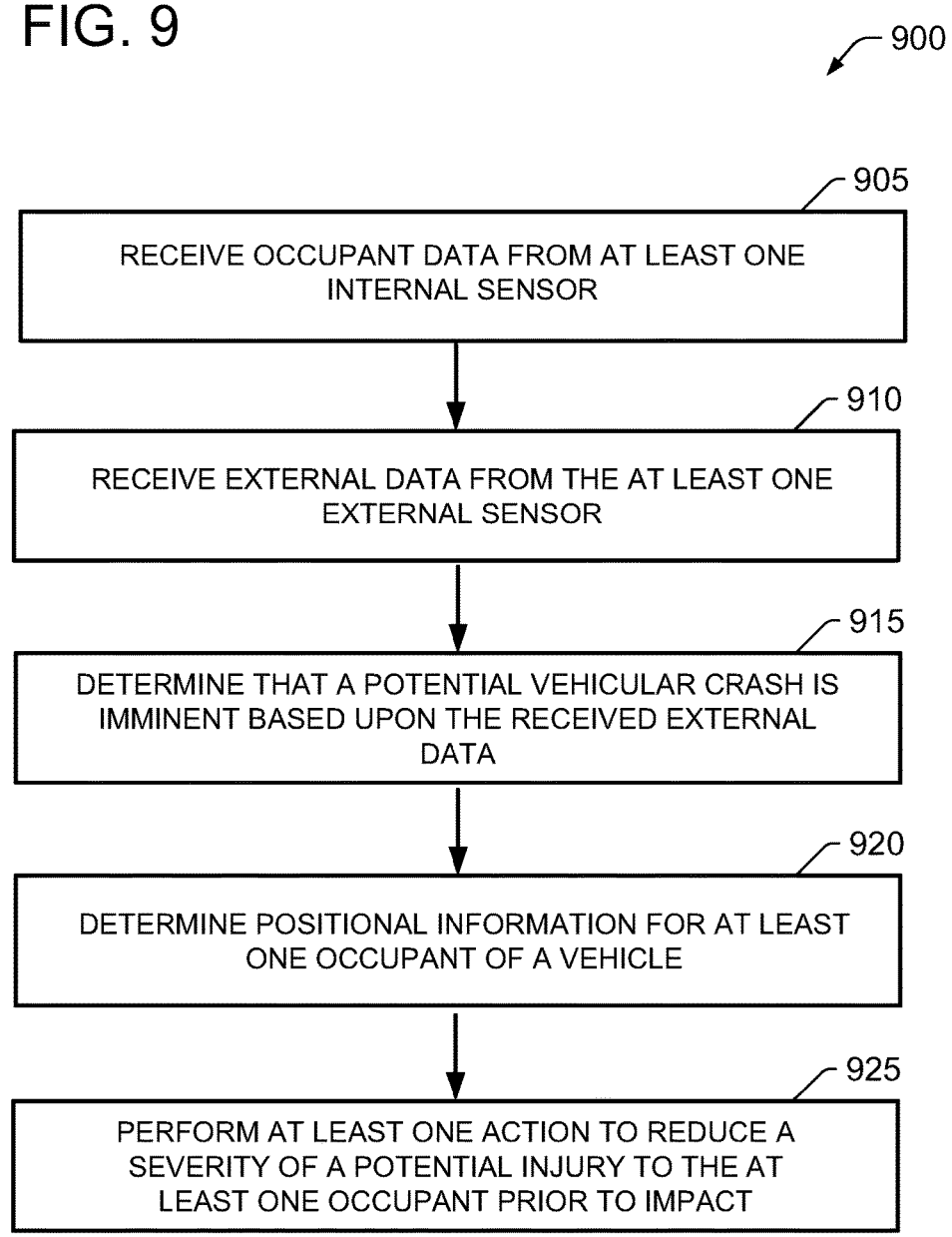
FIG. 9 illustrates a flow chart of another exemplary computer-implemented process of detecting (and/or reconstructing) a vehicular crash using the system shown in FIG. 4.

FIG. 9 illustrates a flow chart of another exemplary computer-implemented process 900 of detecting a vehicular crash using system 400 (shown in FIG. 4). Process 900 may be implemented by a computing device, for example vehicle computer device 110 (shown in FIG. 1). In some embodiments, parts of process 900 may be implemented by AM server 415 (shown in FIG. 2). In the exemplary embodiment, vehicle computer device 110 may be in communication with AM server 415.

In the exemplary embodiment, vehicle computer device 110 receives 905 data from at least one internal facing sensor 105 (shown in FIG. 1). In the exemplary embodiment, at least one internal facing sensor 105 may be one or more of plurality of sensors 105 (shown in FIG. 1) in vehicle 100 (shown in FIG. 1). Internal facing sensors 105 may include cabin-facing sensors that may be configured to collect sensor data associated with occupants (i.e., a driver 115 and a passenger 120 (both shown in FIG. 1)) and/or luggage within the vehicle, such as a location and/or a position of the occupants. The location of an occupant may refer to a particular seat or other portion of the vehicle where the occupant is located. The position of an occupant may refer to a body and/or limb orientation of an occupant relative to the vehicle or components of the vehicle, such as a steering wheel, a front portion of the vehicle, and the like. In some embodiments, the sensors may be configured to collect sensor data associated with weight distribution information of the vehicle, occupants, luggage, fuel, and so forth. In these embodiments, plurality of sensors 105 may detect the presence of fastened seatbelts, the weight in each seat in vehicle 100, heat signatures, distinct voices, image recognition, weight on each wheel, which TV monitors are active, cameras, phone detection, sensors from one or more mobile devices 125 (shown in FIG. 1), and/or any other method of detecting information about driver 115 and passengers 120 in vehicle 100.

In the exemplary embodiment, vehicle computer device 110 receives 910 data from at least one external sensor 105 (shown in FIG. 1). In the exemplary embodiment, at least one external sensor 105 may be one or more of plurality of sensors 105 (shown in FIG. 1) in vehicle 100. The plurality of external sensors 105 may detect the current surroundings and location of vehicle 100. Plurality of external sensors 105 may include, but are not limited to, radar, LIDAR, Global Positioning System (GPS), video devices, imaging devices, cameras, audio recorders, and computer vision. Plurality of external sensors 105 may also include sensors that detect conditions of vehicle 100, such as velocity, acceleration, gear, braking, and other conditions related to the operation of vehicle 100.

Vehicle computer device 110 determines 915 that a potential vehicular crash is imminent based upon the received external sensor data. For example, in the exemplary embodiment, external sensor 105 is an external sensor and may show that another vehicle is about to collide with vehicle 100. Or external sensor 105 may be an impact sensor or any other sensor that allows vehicle computer device 110 to work as described herein.

Vehicle computer device 110 determines 920 positional information for at least one occupant of vehicle 100. Positional information may include a position of an occupant, a direction of facing of the occupant, a size of the occupant, and/or a skeletal positioning of the occupant. The position of the occupant may include which seat the occupant occupies. The direction of facing of the occupant may include whether the occupant is facing forward, reaching forward, reaching to the side, and/or has his/her head turned. The size of the occupant may determine whether the occupant is an adult or a child. The size of the occupant may also include the occupant's height. The skeletal positioning may include positioning of the occupant's joints, spine, arms, legs, torso, neck face, head, major bones, hands, and/or feet. In some embodiments, the internal sensors 105 constantly transmit sensor data to vehicle computer device 110, which constantly determines 920 the positional information of the occupants. In other embodiments, vehicle computer device 110 transmits the internal sensor data to AM server 415, which determines 920 the positional information and transmits that information to vehicle computer device 110.

In some embodiments, vehicle computer device 110 generates a scenario model of the potential vehicular crash based upon the received external and/or internal sensor data. Scenario models may predict damage to vehicle 100 and injuries that may be experiences by driver 115 and passengers 120 of vehicle 100. In the exemplary embodiment, vehicle computer device 110 accesses a database, such as database 202 (shown in FIG. 2). Database 202 may contain a plurality of crash scenarios and the sensor data associated with these crash scenarios. The scenarios may be based upon information from vehicle crash testing facilities, from past crashes that AM server 415 has analyzed, and/or from other sources that allow vehicle computer device 110 to operate as described herein. Vehicle computer device 110 compares the received sensor data with the different stored crash scenarios to generate a scenario model that is the most likely match for the imminent vehicular crash. In some further embodiments, vehicle computer device 110 may communicate the sensor data to AM server 415, where AM server 415 may generate the scenario model. In the some of these embodiments, vehicle computer device 110 determines one or more potential injuries to one or more occupants of vehicle 100 based upon the positional information and the scenario model. Vehicle computer device 110 may also determine a severity for each potential injury.

In some embodiments, vehicle computer device 110 generates a plurality of scenario models that may fit the sensor data received. Vehicle computer device 110 may then rank the generated scenarios based upon the likelihood or degree of certainty that the scenario is correct. In some further embodiments, vehicle computer device 110 may compare the degree of certainty to a predetermined threshold.

In the exemplary embodiment, vehicle computer device 110 performs 925 at least one action to reduce a severity of a potential injury to at least one occupant prior to impact. Using the scenario model, vehicle computer device 110 may be able to determine an advantageous direction of facing for the at least one occupant. Vehicle computer device 110 may then generate a sound through the audio system of vehicle 100, such a horn or alarm sound. The sound would be generated to cause the at least one occupant to change to the advantageous direction of facing. For example, vehicle computer device 110 may generate a honking sound to cause the passenger to turn around to prevent or reduce potential injuries during the imminent vehicular crash. Additionally or alternatively, vehicle computer device 110 may select and engage one or more autonomous or semi-autonomous vehicle features or systems in an attempt to avoid or mitigate the vehicle collision.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

For the method discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

In other embodiments, vehicle computer device 110 may be able to determine an advantageous position for the at least one occupant. Vehicle computer device 110 may cause a seat to shift or move, such as adjusting the recline angle of the seat, to cause the occupant to change to the advantageous position. Vehicle computer device 110 may also rotate the seat of occupant to cause the occupant to change to the advantageous position or advantageous facing.

In yet other embodiments, vehicle computer device 110, in addition to or alternatively to detecting a potential or actual vehicle collision, may also reconstruct a vehicle collision. For instance, vehicle computer device 110 may use the internal sensor data and/or external sensor data generated and/or collected to reconstruct passenger position within the vehicle, as well as vehicle speed and direction, prior to, during, and after a vehicle collision or impact. The vehicle computer device 110 may include additional, less, or alternate functionality, including that discussed elsewhere herein, to reconstruct vehicle collisions.

In some further embodiments, sensors 105 may detect one or more loose objects in the passenger cabin of vehicle 100. Examples of loose objects include, but are not limited to, mobile electronics, purses and other bags, toys, tissue boxes, trash, and other objects in the vehicle that would move during a vehicular collision. In these embodiments, AM server 415 may include the one or more loose objects in the model scenario and may predict one or more injuries based upon potential trajectories of the one or more loose objects.

For instance, in one embodiment, a computer system for reconstructing a vehicle collision may be provided. The computer system may include one or more processors, sensors, and/or transceivers in communication with at least one memory device. The one or more processors, sensors, and/or transceivers may be programmed or otherwise configured to: (1) receive occupant data from at least one internal sensor, the occupant data being generated or collected before, during, and/or after the vehicle collision; (2) receive external data from the at least one external sensor, the external data being generated or collected before, during, and/or after the vehicle collision; (3) determine positional information for at least one occupant of a vehicle before, during, and/or after the vehicle collision; and/or (4) generate a virtual reconstruction of the vehicle crash, the virtual reconstruction indicating a severity of vehicle damage and a severity of a potential injury to the at least one occupant caused by the vehicle collision. The severity of vehicle damage and a severity of a potential injury to the at least one occupant caused by the vehicle collision may be determined or estimated from processor analysis performed by the one or more processors of (i) the occupant data being generated or collected before, during, and/or after the vehicle collision; (ii) the external data being generated or collected before, during, and/or after the vehicle collision; and/or (iii) the positional information for at least one occupant of a vehicle before, during, and/or after the vehicle collision.

The one or more processors may be further programmed to: determine a position and a direction of facing of at least one occupant of the vehicle before, during, and/or after the vehicle collision based upon the internal data; determine occupant skeletal positioning for the at least one occupant before, during, and/or after the vehicle collision based upon the internal data; and/or determine a size of the at least one occupant based upon the internal data.

In another embodiment, a computer-based method for reconstructing a vehicle collision may be provided. The method may be implemented on a vehicle computer device including one or more processors, sensors, and/or transceivers in communication with at least one memory device. The method may include, via the one or more processors, sensors, and/or transceivers: (1) receiving occupant data from at least one internal sensor, the occupant data being generated or collected before, during, and/or after the vehicle collision; (2) receiving external data from the at least one external sensor, the external data being generated or collected before, during, and/or after the vehicle collision; (3) determining, by the vehicle computer device, positional information for at least one occupant of a vehicle before, during, and/or after vehicle collision; and/or (4) generating a virtual reconstruction of the vehicle collision, the virtual reconstruction indicating a severity of damage to the vehicle and a severity of a potential injury to the at least one occupant caused by the vehicle collision. The severity of vehicle damage and a severity of a potential injury to the at least one occupant caused by the vehicle collision may be determined or estimated from processor analysis performed by the one or more processors of (i) the occupant data being generated or collected before, during, and/or after the vehicle collision; (ii) the external data being generated or collected before, during, and/or after the vehicle collision; and/or (iii) the positional information for at least one occupant of a vehicle before, during, and/or after the vehicle collision. The method may include additional, less, or alternate actions, including those discussed elsewhere herein.

Exemplary Extent of Injury Estimation

Figure 11:
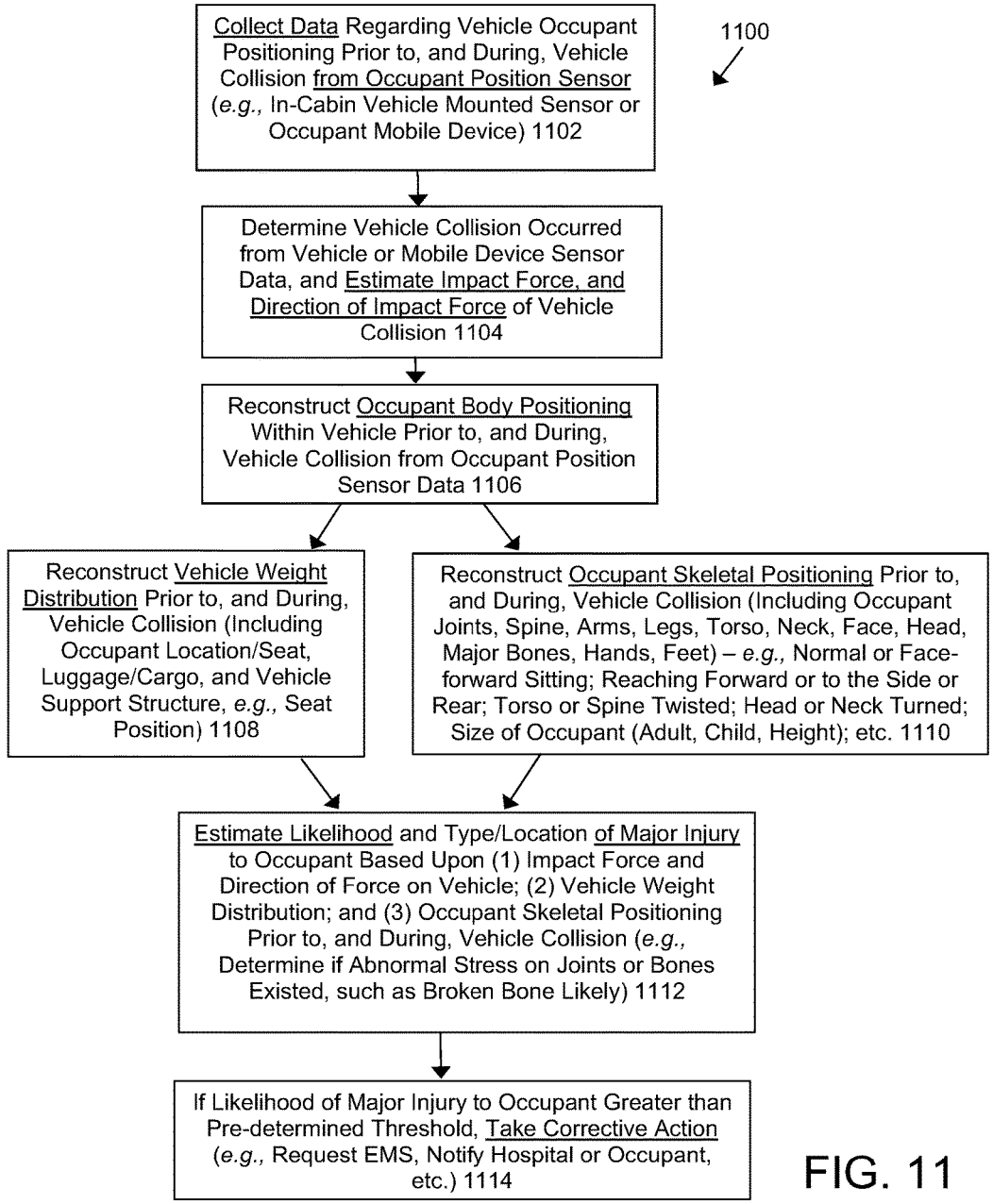
FIG. 11 illustrates a flow chart of an exemplary computer-implemented process of estimating an extent of injury to vehicle occupants resulting from a vehicle collision using the system shown in FIG. 4.

FIG. 11 illustrates a flow chart of an exemplary computer-implemented process of estimating an extent of injury to vehicle occupants resulting from a vehicle collision 1100. The method 1100 may include generating and collecting sensor data regarding vehicle occupant positioning prior to, during, and/or after a vehicle collision from one or more occupant position sensors 1102. The one or more occupant position sensors may be in-cabin vehicle-mounted sensors and/or mobile-device (e.g., wearables, smart phone, etc.) sensors.

The method 1100 may include determining a vehicle collision occurred from vehicle or mobile device sensor data, and estimating the impact force and direction of impact force of the vehicle collision from processor analysis of the vehicle and/or mobile device sensor data 1104. The method 1100 may include virtually reconstructing occupant body positioning with the vehicle prior to, during, and/or after the vehicle collision based upon the occupant position sensor data 1106.

The method 1100 may include reconstructing a vehicle weight distribution prior to, during, and/or after the vehicle collision 1108. For instance, vehicle weight distribution calculated may include and/or account for several factors, such as occupant location and weight, seat occupied by the occupant(s), location and weight of luggage or cargo, and vehicle support structure (e.g., seat position).

The method 1100 may include reconstructing occupant skeletal positioning prior to, during, and/or after the vehicle collision 1110. Occupant skeletal positioning may include and/or account for position of occupant joins, spine, arms, legs, torso, neck, face, head, major bones, hands, feet, etc. Occupant skeletal positioning may also include, account for, and/or characterize occupant position as normal or face-forward sitting, reaching forward, reaching to the side or rear, torso or spine twisted, head or neck twisted or turned, size of occupant (adult, child, height, weight), etc.

The method 1100 may include estimating or calculating a likelihood and/or type (or body location) of major injury to one or more occupants based upon (1) impact force and direction of force on the vehicle; (2) vehicle weight distribution; and/or (3) occupant skeletal positioning prior to, during, and/or after the vehicle collision 1112. For instance, the method 1000 may determine or estimate if there was an abnormal stress on joints or bones, such as determine if any broken bones likely resulted from the vehicle collision.

The method 1100 may include if the likelihood of major injury to any occupant is greater than a pre-determined threshold (such as greater than 5, 10, or 20%). If so, the method 1100, may take corrective action 1114. For instance, the method 1100 may request an ambulance and/or notify a hospital via wireless communication or data transmission sent over one or more radio frequency links or communication channels.

Exemplary Autonomous Feature Selection & Engagement

In one aspect, a computer system for detecting a vehicular crash, and/or selecting an autonomous or semi-autonomous vehicle feature or system to engage to avoid or mitigate the vehicle collision may be provided. The computer system may include one or more processors, sensors, and/or transceivers in communication with at least one memory device. The one or more processors, sensors, and/or transceivers may be programmed to: (1) receive occupant data from at least one internal sensor, the occupant data being generated or collected prior to a vehicle collision; (2) receive external data from the at least one external sensor, the external data being generated or collected prior to the vehicle collision; (3) determine that a potential vehicular crash is imminent based upon the received external data; (4) determine positional information for at least one occupant of a vehicle based upon the occupant data; and/or (5) automatically engage an autonomous or semi-autonomous vehicle feature or system to avoid the vehicle collision or otherwise mitigate vehicle damage and/or occupant injury caused by the vehicle collision.

The one or more processors, sensors, and/or transceivers may be configured or programmed to select an autonomous or semi-autonomous vehicle feature or system to engage based upon (i) the occupant data, (ii) the external data, and/or (iii) the positional information. Additionally or alternatively, the system may be configured to select an autonomous or semi-autonomous vehicle feature or system to engage based upon (1) vehicle weight distribution; and/or (2) occupant skeletal positioning prior to the vehicle collision (as determine from analysis of vehicle-mounted and/or mobile device sensor data, and discussed with respect to FIG. 11). The system may include additional, less, or alternate functionality, including that discussed elsewhere herein.

In another aspect, a computer-based method for detecting a vehicular crash and/or selecting an autonomous or semi-autonomous vehicle feature to engage may be provided. The method may be implemented on a vehicle computer device including one or more processors, sensors, and/or transceivers in communication with at least one memory device. The method may include, via the one or more processors, sensors, and/or transceivers: (1) receiving occupant data from at least one internal sensor; (2) receiving external data from the at least one external sensor; (3) determining, by the vehicle computer device, that a potential vehicular crash is imminent based upon the received external data; and/or (4) automatically engaging an autonomous or semi-autonomous vehicle feature or system to avoid the vehicle collision or otherwise mitigate damage caused by the vehicle collision. The method may further include determining, via the one or more processors, sensors, and/or transceivers, positional information for at least one occupant of a vehicle based upon the occupant data.

The method may include selecting, via the one or more processors, sensors, and/or transceivers, an autonomous or semi-autonomous vehicle feature or system to engage based upon (i) the occupant data, (ii) the external data, (iii) the positional information, and/or other sensor data. For instance, an amount of deceleration or force to apply to the brakes may be determined based upon the (i) occupant data, (ii) external data, and/or (iii) positional information. Additionally or alternatively, the method may include selecting, via the one or more processors, sensors, and/or transceivers, an autonomous or semi-autonomous vehicle feature or system to engage based upon (1) vehicle weight distribution; and/or (2) occupant skeletal positioning prior to the vehicle collision (as determine from analysis of vehicle-mounted and/or mobile device sensor data, and discussed with respect to FIG. 11). The method may include additional, less, or alternate actions, including those discussed elsewhere herein.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

For the method discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Exemplary Computer Device

Figure 10:
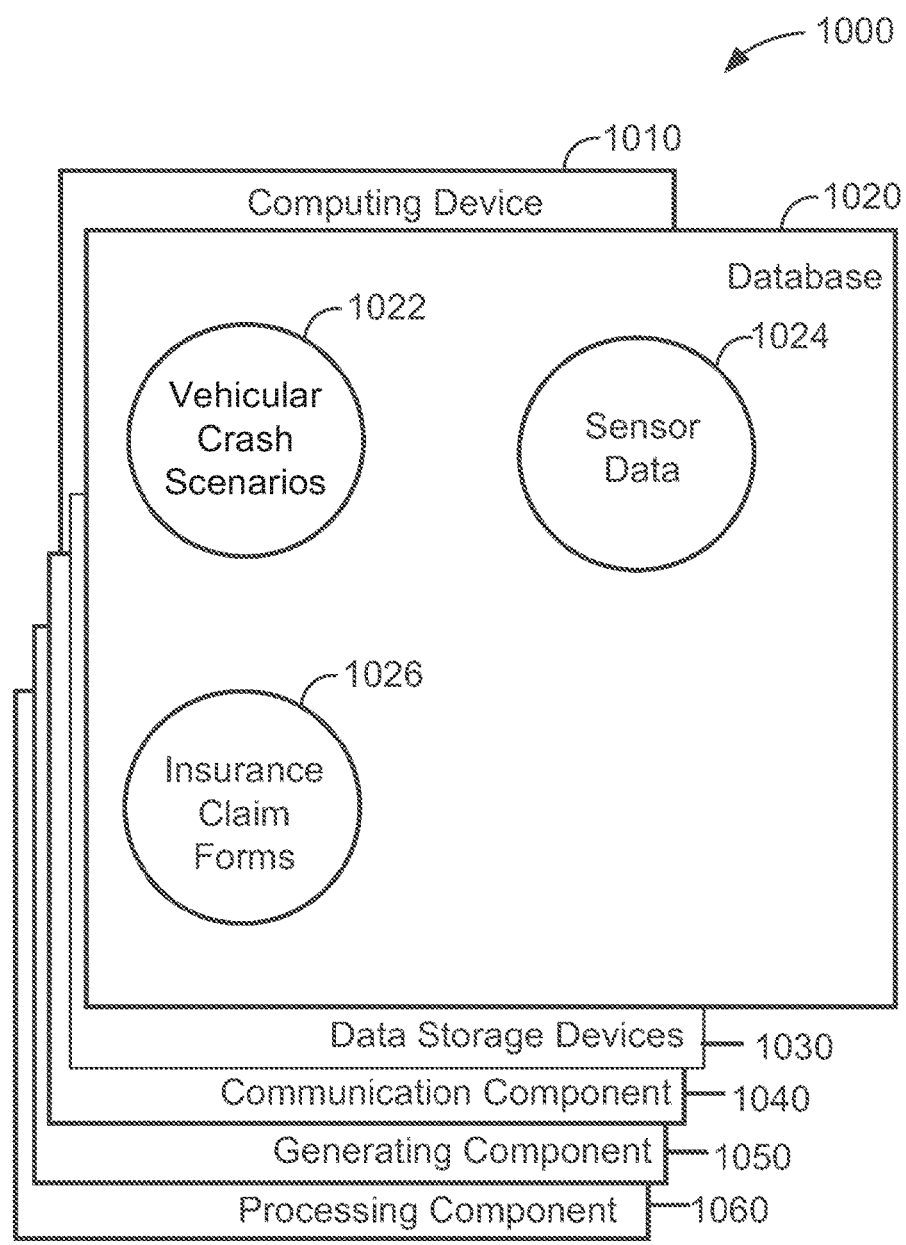
FIG. 10 illustrates a diagram of components of one or more exemplary computing devices that may be used in the system shown in FIG. 4.

FIG. 10 depicts a diagram 1000 of components of one or more exemplary computing devices 1010 that may be used in system 400 shown in FIG. 4. In some embodiments, computing device 1010 may be similar to AM server 206 (shown in FIG. 2). Database 1020 may be coupled with several separate components within computing device 1010, which perform specific tasks. In this embodiment, database 1020 may include vehicular crash scenarios 1022, sensor data 1024, and/or insurance claim forms 1026. In some embodiments, database 1020 is similar to database 420 (shown in FIG. 4).

Computing device 1010 may include the database 1020, as well as data storage devices 1030. Computing device 1010 may also include a communication component 1040 for receiving 305 sensor data, transmitting 315 the scenario model, and receiving 320 a confirmation (all shown in FIG. 3). Computing device 1010 may further include a generating component 1050 for generating 310 a scenario model and generating 330 at least one insurance claim form (both shown in FIG. 3). A processing component 1060 may assist with execution of computer-executable instructions associated with the system.

Exemplary Autonomous Systems

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

For the method discussed directly above, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Below are some examples of autonomous or semi-autonomous vehicle-related functionality or technology replacing human driver action when AM server 415 determines that a vehicular crash is imminent. AM server 415 generates a scenario model of the potential vehicular crash and determines at least one potential injury to at least one occupant of vehicle 100 based upon the scenario model. In a first example, AM server 415 may determine that the occupant is facing the wrong direction and that the angle of impact may cause serious injury to the occupant. AM server 415 may sound a noise, such as a horn, to attract the attention of the occupant and entice the occupant to change their direction of facing, such as towards the sounds.

In some examples, AM server 415 may initiate a change in the angle of impact of the vehicular impact to reduce potential injuries. For example, AM server 415 may cause change in the angle of impact to change the forces that will affect the occupants of vehicle 100. AM server 415 may also change where the impact will occur on vehicle 100. For example, AM server 415 may determine that it is better for the impact to occur at the front of vehicle 100, where the engine is, instead of in the area of the passenger cabin. AM server 415 may also determine how to change the angle of impact to be a glancing blow instead of a direct collision.

To implement these changes, AM server 415 may instruct an autonomous or semiautonomous system to activate to change the angle of impact. For example, AM server 415 may activate the steering to cause the wheels of vehicle 100 to turn to cause the impact to be on a different part of vehicle 100 or at a different angle. AM server 415 may also cause the brakes to activate, or, counterintuitively, may cause the brakes to not activate and instead accelerate vehicle 100 to change where the impact occurs. In another example, AM server 415 may cause the airbags to deploy at different points in time during the vehicular impact based upon the scenario model to reduce the severity of the potential injuries.

As described above, vehicle 100 may include a pedestrian detection system that allows AM server 415 to determine the positions of pedestrians around vehicle 100 and how the vehicular impact may affect the pedestrians. AM server 415 may rotate or reposition vehicle to reduce the likelihood of injury to the pedestrians. In some examples, AM server 415 may choose between impacting another vehicle and impacting a stationary object. Based upon the scenario models, AM server 415 may determine that the potential injury to one or more occupants of vehicle may be lessened by impacting the stationary objection. AM server 415 may cause vehicle 100 to steer into stationary object instead of a different vehicle.

Exemplary Embodiments & Functionality

In one aspect, a computer system for reconstructing a vehicular crash may be provided. The computer system may include at least one processor in communication with at least one memory device. The at least one processor may be configured or programmed to: (1) receive sensor data of a vehicular crash from at least one mobile device associated with a user; (2) generate a scenario model of the vehicular crash based upon the received sensor data; (3) transmit the scenario model to a user computer device associated with the user; (4) receive a confirmation of the scenario model from the user computer device; (5) store the scenario model; and/or (6) generate at least one insurance claim form based upon the scenario model to facilitate quickly and accurately processing an insurance claim.

A further enhancement may be where the computer system may transmit a message to one or more emergency services based upon the scenario model. The one or more emergency services may include, but are not limited to, a towing server, an emergency medical service provider, a fire department, a police department, and/or some other emergency responder. The computer system may select the one or more emergency services to transmit to based upon the scenario model and the location of the vehicular crash.

The computer system may achieve the above results by storing a database of vehicular crash scenarios based upon past vehicular crashes and sensor data associated with the vehicular crash scenarios. The computer system may then compare the database of vehicular crash scenarios to the received sensor data and generate the scenario model of the vehicular crash based upon the comparison. The computer system may also achieve the above results by generating a plurality of scenario models of the vehicular crash based upon the sensor data and the database of vehicular crash scenarios. The computer system may determine a certainty of each of the plurality of scenario models. The computer system may generate the scenario model from the plurality of scenario models based upon the certainty associated with the scenario model. A further enhancement may be where the computer system may be configured to update the database of vehicular crash scenarios based upon the stored scenario.

The mobile device described herein may be a one of the vehicle involved in the vehicular crash, a cellular connected computer device, and an Internet connected computer device. The mobile device may include one or more sensors.

The sensor data described herein may include, but is not limited to, a measurement of at least one of speed, direction rate of acceleration, rate of deceleration, location, position, orientation, and rotation of the vehicle, and a measurement of one or more changes to at least one of speed, direction rate of acceleration, rate of deceleration, location, position, orientation, and rotation of the vehicle. The sensor data may be based upon a period of time prior to the vehicular crash and continuing through to a period of time after the vehicular crash.

A further enhancement may be where the computer system may receive changes to the scenario model from the user. The computer system may update the scenario model based upon the user's changes.

Another enhancement may be where the computer system may determine a severity for the vehicular accident based upon the scenario model. The computer system may also be able to determine one or more potential damages to the vehicle based upon the scenario model.

A further enhancement may be where the computer system described herein may be configured to determine at least one potential injury of an occupant of the vehicle based upon the scenario model. The computer system may also transmit the at least one potential injury to the user computer device and receive confirmation of the at least one potential injury from the user computer device.

A further enhancement may be where the computer system may receive sensor data from a second vehicle involved in the vehicular crash. The computer system may update the scenario model based upon the sensor data from the second vehicle.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the mobile device or vehicle from device details, mobile device sensors, geolocation information, image data, and/or other data.

In one embodiment, a processing element may be trained by providing it with a large sample of phone and/or online credentials with known characteristics or features. Such information may include, for example, fingerprint, device print, verification codes, PBQA, and/or passive voice analysis.

Based upon these analyses, the processing element may learn how to identify characteristics and patterns that may then be applied to analyzing sensor data, authentication data, image data, mobile device data, and/or other data. For example, the processing element may learn, with the user's permission or affirmative consent, to identify the user based upon the user's device or login information. The processing element may also learn how to identify different types of accidents and vehicular crashes based upon differences in the received sensor data. The processing element may further learn how to recreate a vehicular accident based upon partial or incomplete information and determine a level of certainty that the recreation is correct. As a result, at the time of receiving accident data, providing automated reconstruction of a vehicular accident, providing automated population of insurance claim forms, providing automated contact of emergency service personnel, providing information about the vehicular accident prior to the arrival of the emergency service personnel on the scene, providing, and/or providing automated detection of vehicular accidents as they are occurring.

Additional Exemplary Embodiments

In still another aspect, a computer system for detecting a vehicular crash may be provided. The computer system may include at least one processor, sensor, and/or transceiver in communication with at least one memory device, the at least one processor, sensor, and/or transceiver. The at least one processor may be programmed to (1) receive data from said at least one sensor; (2) determine that a potential vehicular crash is imminent based upon the received data; and/or (3) transmit one or more high priority packets including a notification that the potential vehicular crash is imminent. The computer system may include additional, less, or alternate functionality, including that discussed elsewhere herein.

For instance, the data from said at least one sensor may include speed, acceleration, braking, skidding, rate of deceleration, orientation, and rotation information; and/or image data associated with an area forward of a direction of travel of a vehicle that is acquired by a video recorder or camera mounted on the vehicle. Determining that a potential vehicular crash is imminent may be based upon applying object recognition techniques on the image data acquired by the video recorder or camera mounted on the vehicle. Determining that a potential vehicular crash is imminent may further be based upon vehicle speed, acceleration, and braking data. Determining that a potential vehicular crash is imminent may be based upon processor analysis of vehicle speed and acceleration data, and the image data acquired by a vehicle mounted video recorder or camera.

Determining that a potential vehicular crash is imminent may be based upon processor analysis of vehicle speed and acceleration data, and analysis of the image data acquired by a vehicle mounted video recorder or camera that determines whether an object in a direction of travel of the vehicle is within a predetermined or threshold distance for the given vehicle speed and acceleration.

The sensor data may be analyzed to estimate a severity of the expected vehicular crash, and the estimated severity of the expected vehicular crash may be transmitted to a remote server via wireless communication or data transmission over one or more radio links or wireless communication channels.

The estimated severity of the expected vehicular crash may be determined based upon vehicle speed, acceleration, and braking data acquired from mobile device-mounted sensors and/or vehicle-mounted sensors, and a size and type of the object determined to be in the direction of travel of the vehicle from performing object recognition techniques on the image data captured by one or more vehicle-mounted cameras or video recorders. The type of the object determined to be in the direction of travel of the vehicle may be a compact vehicle, sport-utility vehicle, truck, or semi-truck. The type of the object determined to be in the direction of travel of the vehicle may be a concrete pillar or support, a street sign, traffic light, or other road marking. The type of the object determined to be in the direction of travel of the vehicle may be an animal or a tree.

The estimated severity of the expected vehicular crash may be determined to be an anticipated total loss, and a total loss insurance claim handling process may be started by a remote server. The estimated severity of the expected vehicular crash may be used to start an insurance claim handling process and/or used to pre-populate a virtual insurance claim for insured review and/or approval.

In another aspect, a computer-implemented method of routing emergency responders to a vehicle collision, or otherwise provided notice of an imminent vehicle collision, may be provided. The method may include (1) receiving, via one or more processors and/or transceivers that are mounted on a vehicle or mobile device traveling within the vehicle, sensor data from one or more sensors mounted on the vehicle or mobile device traveling within the vehicle; (2) determining, via the one or more processors, that a vehicle collision is imminent (or likely imminent) based upon analysis of the sensor data; (3) determining, via the one or more processors, an estimated severity of the vehicle collision based upon analysis of the sensor data; (4) determining, via the one or more processors, whether the estimated severity is above a predetermined threshold; (5) if the estimated severity is above the predetermined threshold, then, via the one or more processors, generating an electronic message detailing the imminent vehicle collision; and (6) broadcasting, via the one or more processors and/or transceivers, the electronic message to a remote server via wireless communication or data transmission over one or more radio links or wireless communication channels to facilitate emergency responders responding to the vehicle collision expeditiously. The method may include additional, less, or alternate actions, including those discussed elsewhere herein, and may be implemented via one or more local or remote processors, servers, sensors, and/or transceivers, and/or via computer-executable instructions stored on non-transitory computer-readable medium or media.

For instance, the sensor data may include vehicle speed, acceleration, and braking information. The sensor data may further include image data of area in a direction of vehicle travel or otherwise forward of the moving vehicle, the image data being acquired from one or more video recorders or cameras mounted on the vehicle, a dashboard of the vehicle, or a mobile device traveling within the vehicle.

The method may include analyzing, via the one or more processors, the image data using object recognition or pattern recognition techniques to identify objects forward of the moving vehicle. The method may include using the results of the object recognition or pattern recognition techniques performed on the image data to identify type of objects forward of the moving vehicle. The object forward of the moving vehicle identified may be a compact vehicle, sport utility vehicle, or a truck. The object forward of the moving vehicle identified may be a concrete pillar or support, a road sign, a traffic light, or mile marker. The object forward of the moving vehicle identified may be an animal or a tree.

Determining, via the one or more processors, that a vehicle collision is imminent (or likely imminent) based upon analysis of the sensor data may include processor analysis of vehicle speed and acceleration data, and determining whether or not an object shown in image data is within a predetermined distance of the vehicle. The one or more processors may determine that based upon the sensor data (such as vehicle speed, acceleration, and braking) and distance to an object shown in the image data that a collision will occur in 0.5 seconds, 1 second, 2 seconds, 3 seconds, etc. For instance, a processor may determine that a vehicle collision is imminent if it is likely to occur within 1-3 seconds.

Determining, via the one or more processors, an estimated severity of the vehicle collision based upon analysis of the sensor data may include processor analysis of vehicle speed and acceleration data, and determining a size and type of an object shown in image data forward of a direction of travel of the vehicle.

Determining, via the one or more processors, an estimated severity of the vehicle collision based upon analysis of the sensor data may include processor analysis of vehicle speed and acceleration data, and determining a size and type of an object shown in image data forward of a direction of travel of the vehicle, and a distance to the object. Determining, via the one or more processors, whether the estimated severity is above a predetermined threshold may include estimating an amount of vehicle damage from the vehicle collision and estimating whether or not the vehicle will be drivable or not.

Determining, via the one or more processors, whether the estimated severity is above a predetermined threshold may include determining whether or not the vehicle is expected to be a total loss or not. Generating an electronic message detailing the imminent vehicle collision may indicate a GPS location of the vehicle, number of passengers, and type of object colliding with the vehicle. Generating an electronic message detailing the imminent vehicle collision may indicate whether the vehicle is expected or anticipated to be a total loss. Generating an electronic message detailing the imminent vehicle collision may indicate whether the vehicle is expected or anticipated to be a total loss, and the remote server begins a total loss handling process. Additionally or alternatively, generating an electronic message detailing the imminent vehicle collision indicates an estimated amount of vehicle damage, and the remote server prepares a virtual insurance claim form for an insured's review and approval.

In another aspect, a computer system configured to provide notice to emergency responders, and/or route emergency responders to a vehicle collision may be provided. The computer system may include one or more processors, transceivers, and/or sensors mounted on a vehicle or a mobile device traveling within the vehicle that are configured to: (1) receive or generate sensor data from one or more sensors mounted on the vehicle or mobile device traveling within the vehicle; (2) determine that a vehicle collision is imminent (or likely imminent) based upon analysis of the sensor data; (3) determine an estimated severity of the vehicle collision based upon analysis of the sensor data; (4) determine whether the estimated severity is above a predetermined threshold; (5) if the estimated severity is above the predetermined threshold, then generate an electronic message detailing the imminent vehicle collision; and/or (6) broadcast the electronic message to a remote server via wireless communication or data transmission over one or more radio links or wireless communication channels to facilitate emergency responders responding to the vehicle collision expeditiously. The computer system may include additional, less, or alternate functionality, including that discussed elsewhere herein.

In yet another aspect, a computer system for detecting a vehicular crash may be provided. The computer system may include at least one processor in communication with at least one memory device, the at least one processor. The at least one processor may be programmed to (1) (locally or remotely) receive occupant data from at least one internal sensor (such as via wired or wireless communication); (2) (locally or remotely) receive external data from at least one external sensor (such as via wired or wireless communication); (3) determine that a potential vehicular crash is imminent based upon the received external data; (4) determine positional information for at least one occupant of a vehicle and/or (5) perform at least one action to reduce a severity of a potential injury to the at least one occupant prior to impact. The method may include additional, less, or alternate actions, including those discussed elsewhere herein, and may be implemented via one or more local or remote processors, servers, sensors, and/or transceivers, and/or via computer-executable instructions stored on non-transitory computer-readable medium or media.

For instance, the data from the at least one external sensor may include speed, acceleration, and braking information; and/or image data associated with an area forward of a direction of travel of a vehicle that is acquired by a video recorder or camera mounted on the vehicle. Determining that a potential vehicular crash is imminent may be based upon applying object recognition techniques on the image data acquired by the video recorder or camera mounted on the vehicle. Determining that a potential vehicular crash is imminent may further be based upon vehicle speed, acceleration, deceleration, corning, and braking data. Determining that a potential vehicular crash is imminent may be based upon processor analysis of vehicle speed and acceleration data, and the image data acquired by a vehicle mounted video recorder or camera.

The processor may generate a model of the potential vehicular crash based upon the received data to further analyze. The processor may also determine a position and a direction of facing of at least one occupant of the vehicle and use the model to determine an advantageous direction of facing for the at least one occupant. If one of the occupants is not facing in an advantageous way, the processor may generate a sound through the audio system to cause the at least one occupant to change to the advantageous direction of facing. The processor may also cause a seat or a portion of a seat of an occupant to move, shift, and/or rotate to change the position and/or direction of facing of the occupant.

Other corrective actions may be taken by the vehicle or a vehicle controller after a vehicle collision is determined to be imminent or potentially imminent. In one embodiment, the processor may be further programmed to automatically engage an autonomous or semi-autonomous vehicle feature or system to mitigate damage and/or injury caused by the vehicle collision.

For instance, if the vehicle is an autonomous vehicle, the vehicle controller may take control of the vehicle (such as from a human driver driving the vehicle) and maneuver the vehicle to avoid the collision, such as by braking, accelerating, or swerving to avoid another vehicle. Other vehicle maneuvers automatically directed by the autonomous vehicle after a vehicle collision is determined to be likely may mitigate the damage to the vehicle and/or injuries to vehicle occupant. For instance, the vehicle may automatically brake and/or deploy air bags.

The types of autonomous or semi-autonomous vehicle-related functionality or technology that may be used with the present embodiments to replace human driver actions may include and/or be related to the following types of functionality: (a) fully autonomous (driverless); (b) limited driver control; (c) vehicle-to-vehicle (V2V) wireless communication; (d) vehicle-to-infrastructure (and/or vice versa) wireless communication; (e) automatic or semi-automatic steering; (f) automatic or semi-automatic acceleration; (g) automatic or semi-automatic braking; (h) automatic or semi-automatic blind spot monitoring; (i) automatic or semi-automatic collision warning; (j) adaptive cruise control; (k) automatic or semi-automatic parking/parking assistance; (l) automatic or semi-automatic collision preparation (windows roll up, seat adjusts upright, brakes pre-charge, etc.); (m) driver acuity/alertness monitoring; (n) pedestrian detection; (o) autonomous or semi-autonomous backup systems; (p) road mapping systems; (q) software security and anti-hacking measures; (r) theft prevention/automatic return; (s) automatic or semi-automatic driving without occupants; and/or other functionality.

For instance, the wireless communication-based autonomous or semi-autonomous vehicle technology or functionality may include and/or be related to: automatic or semi-automatic steering; automatic or semi-automatic acceleration and/or braking; automatic or semi-automatic blind spot monitoring; automatic or semi-automatic collision warning; adaptive cruise control; and/or automatic or semi-automatic parking assistance. Additionally or alternatively, the autonomous or semi-autonomous technology or functionality may include and/or be related to: driver alertness or responsive monitoring; pedestrian detection; artificial intelligence and/or back-up systems; navigation or GPS-related systems; security and/or anti-hacking measures; and/or theft prevention systems.

Exemplary Vehicle Collision Mitigation

In one aspect, a computer system for detecting a vehicular collision may be provided. The computer system including at least one processor in communication with at least one memory device, and the at least one processor is programmed to: (1) receive occupant data from at least one internal sensor; (2) receive external data from the at least one external sensor; (3) determine that a potential vehicular collision is imminent based upon the received external data; (4) determine positional information for at least one occupant of a vehicle; and/or (5) perform at least one action to reduce a severity of a potential injury to the at least one occupant prior to impact of the potential vehicular collision. The system may include additional, less, or alternate functionality, including that discussed elsewhere herein.

For instance, the processor may be programmed to generate a model of the potential vehicular collision based upon the received internal data and the received external data. The processor may be further programmed to: determine a position and a direction of facing of the at least one occupant of the vehicle based upon the internal data; and/or determine at least one of an advantageous position and an advantageous direction of facing for the at least one occupant based upon the model.

The processor may be further programmed to generate a sound through the audio system to cause the at least one occupant to change to at least one of the advantageous direction of facing and the advantageous position. The processor may further be programmed to move a seat occupied by an occupant to cause the occupant to change to at least one of the advantageous direction of facing and the advantageous position.

The processor may be programmed to rotate a seat occupied by an occupant to rotate the occupant to at least one of the advantageous direction of facing and the advantageous position. The processor may be programmed to determine occupant skeletal positioning for the at least one occupant based upon the occupant or other internal data. The processor may be programmed to determine a size of the at least one occupant based upon the occupant or other internal data.

The processor may be programmed to automatically engage an autonomous or semi-autonomous vehicle feature or system to mitigate damage caused by the vehicle collision. The autonomous or semi-autonomous vehicle technology is related to at least one of driver alertness monitoring, driver responsiveness monitoring, pedestrian detection, artificial intelligence, a back-up system, a navigation system, a positioning system, a security system, an anti-hacking measure, a theft prevention system, and remote vehicle location determination.

In another aspect, a computer-based method for detecting a vehicular collision may be provided. The method may be implemented on a vehicle computer device including at least one processor in communication with at least one memory device. The method may include, via one or more processors, sensors, and/or transceivers: (1) receiving occupant data from at least one internal sensor; (2) receiving external data from the at least one external sensor; (3) determining, by the vehicle computer device, that a potential vehicular collision is imminent based upon the received external data; (4) determining, by the vehicle computer device, positional information for at least one occupant of a vehicle; and/or (5) performing at least one action to reduce a severity of a potential injury to the at least one occupant prior to impact. The method may include additional, less, or alternate actions, including those discussed elsewhere herein.

In another aspect, a computer system for detecting a vehicular collision may be provided. The computer system may include one or more processors, sensors, and/or transceivers in communication with at least one memory device. The one or more processors, sensors, and transceivers may be programmed to: (1) receive occupant or other internal data from at least one internal sensor; (2) receive external data from the at least one external sensor; (3) determine that a potential vehicular collision is imminent based upon the received external data; (4) when it is determined that a potential vehicular collision is imminent based upon the received external data, then determine positional information for at least one occupant of a vehicle based upon the occupant and/or other internal data; (5) determine at least one action intended to reduce a severity of a potential injury to the at least one occupant to perform prior to, during, and/or after impact based upon (i) the occupant and/or internal data, (ii) the external data, and/or (iii) the positional information for the at least one occupant determined from the occupant and/or other internal data; and/or (6) perform at least one action to reduce a severity of a potential injury to the at least one occupant prior to, during, and/or after impact of the potential vehicular collision. The system may include additional, less, or alternate functionality, including that discussed elsewhere herein.

In another aspect, a computer-based method for detecting a vehicular collision may be provided. The method may be implemented on a vehicle computer device including one or more processors, transceivers, and/or sensors in communication with at least one memory device. The method may include, via one or more processors, sensors, and/or transceivers: (1) receiving occupant or other internal data from at least one internal sensor; (2) receiving external data from the at least one external sensor; (3) determining, by the vehicle computer device, that a potential vehicular collision is imminent based upon the received external data; (4) when it is determined that a potential vehicular collision is imminent based upon the received external data, then determining, by the vehicle computer device, positional information for at least one occupant of a vehicle based upon the received occupant and/or other internal data; (5) determining, by the vehicle computer device, at least one action intended to reduce a severity of a potential injury to the at least one occupant to perform prior to, during, and/or after impact based upon (i) the occupant and/or internal data, (ii) the external data, and/or (iii) the positional information for the at least one occupant determined from the occupant and/or other internal data; and/or (6) performing or initiating, by the vehicle computer device, the at least one action intended to reduce a severity of a potential injury to the at least one occupant prior to, during, and/or after impact of the potential vehicular collision. The method may include additional, less, or alternate actions, including those discussed elsewhere herein.

Exemplary Vehicle Collision Reconstruction

In another aspect, a computer system for reconstructing a vehicle collision, the computer system including at least one processor in communication with at least one memory device, the at least one processor is programmed to: receive occupant data from at least one internal sensor, the occupant data being generated or collected at least one of before, during, and after the vehicle collision; receive external data from the at least one external sensor, the external data being generated or collected at least one of before, during, and after the vehicle collision; determine positional information for at least one occupant of a vehicle at least one of before, during, and after the vehicle collision based upon the occupant data; and/or generate a virtual reconstruction of the vehicle collision, the virtual reconstruction indicating a severity of vehicle damage and a severity of a potential injury to the at least one occupant caused by the vehicle collision. The system may include additional, less, or alternate functionality, including that discussed elsewhere herein.

For instance, the severity of vehicle damage and a severity of a potential injury to the at least one occupant caused by the vehicle collision may be determined from at least one of the occupant data being generated or collected at least one of before, during, and after the vehicle collision, the external data being generated or collected at least one of before, during, and after the vehicle collision, and the positional information for at least one occupant of a vehicle at least one of before, during, and after the vehicle collision.

The processor may be programmed to determine a position and a direction of facing of the at least one occupant of the vehicle at least one of before, during, and after the vehicle collision based upon the internal data. The processor may be programmed to determine occupant skeletal positioning for the at least one occupant at least one of before, during, and after the vehicle collision based upon the internal data. The processor may be programmed to determine a size of the at least one occupant based upon the internal data.

The processor may be programmed to automatically engage an autonomous or semi-autonomous vehicle feature or system to mitigate damage caused by the vehicle collision. The autonomous or semi-autonomous vehicle technology may be related to at least one of driver alertness monitoring, driver responsiveness monitoring, pedestrian detection, artificial intelligence, a back-up system, a navigation system, a positioning system, a security system, an anti-hacking measure, a theft prevention system, and remote vehicle location determination.

In another aspect, a computer-based method for reconstructing a vehicle collision may be provided. The method may be implemented on a vehicle computer device including one or more processors, sensors, and/or transceivers in communication with at least one memory device, the method comprising, via one or more processors, sensors, and/or transceivers: receiving occupant data from at least one internal sensor, the occupant data being generated or collected before, during, and/or after the vehicle collision; receiving external data from the at least one external sensor, the external data being generated or collected before, during, and/or after the vehicle collision; determining, by the vehicle computer device, positional information for at least one occupant of a vehicle before, during, and/or after vehicle collision; and/or generating a virtual reconstruction of the vehicle collision, the virtual reconstruction indicating a severity of damage to the vehicle and a severity of a potential injury to the at least one occupant caused by the vehicle collision. The method may include additional, less, or alternate functionality, including that discussed elsewhere herein.

In another aspect, a computer system for reconstructing a vehicle collision may be provided. The computer system may include one or more processors, sensors, and/or transceivers in communication with at least one memory device, the one or more processors, sensors, and/or transceivers configured or programmed to: receive occupant data from at least one internal sensor mounted on a vehicle and configured to collect date internal to the vehicle, the occupant data being generated or collected at least one of before, during, and after the vehicle collision and being associated with the vehicle interior; receive external data from the at least one external sensor mounted on the vehicle and configured to collect data external to the vehicle, the external data being generated or collected at least one of before, during, and after the vehicle collision and being associated with the vehicle exterior; determine positional information for at least one occupant of a vehicle at least one of before, during, and after the vehicle collision based upon the occupant (and/or other internal) data; and/or generate a virtual reconstruction of the vehicle collision, the virtual reconstruction indicating a severity of vehicle damage and a severity of a potential injury to the at least one occupant caused by the vehicle collision based upon computer analysis of (i) the occupant data, (ii) the external data, and/or (iii) the positional information. The system may include additional, less, or alternate functionality, including that discussed elsewhere herein.

In another aspect, a computer-based method for reconstructing a vehicle collision may be provided. The method may be implemented on a vehicle computer device including one or more processors, sensors, and/or transceivers in communication with at least one memory device, the method comprising, via one or more processors, sensors, and/or transceivers: (1) receiving occupant data from at least one internal sensor mounted on a vehicle and configured to collect data associated with the vehicle interior, the occupant data being generated or collected before, during, and/or after the vehicle collision and is associated with the vehicle interior; (2) receiving external data from the at least one external sensor mounted on the vehicle and configured to collect data associated with the vehicle exterior, the external data being generated or collected before, during, and/or after the vehicle collision and is associated with the vehicle exterior; (3) determining, by the vehicle computer device, positional information for at least one occupant of a vehicle before, during, and/or after vehicle collision based upon the occupant and/or other internal data; and/or (4) generating a virtual reconstruction of the vehicle collision, the virtual reconstruction indicating a severity of damage to the vehicle and a severity of a potential injury to the at least one occupant caused by the vehicle collision based upon (i) the external data, (ii) the occupant or other internal data, and/or (iii) the positional information for the at least one occupant. The method may include additional, less, or alternate actions, including those discussed elsewhere herein.

Autonomous Feature Engagement

In one aspect, a computer system for detecting a vehicular collision and engaging an autonomous technology feature may be provided. The computer system including one or more processors, sensors, and/or transceivers in communication with at least one memory device, the at least one processor is programmed to: receive occupant data from at least one internal sensor, the occupant data being generated or collected prior to a vehicle collision; receive external data from the at least one external sensor, the external data being generated or collected prior to the vehicle collision; determine that a potential vehicular collision is imminent based upon the received external data; determine positional information for at least one occupant of a vehicle based upon the occupant data; and/or automatically engage an autonomous or semi-autonomous vehicle feature or system to mitigate at least one of vehicle damage and occupant injury caused by the vehicle collision. The at least one processor may be configured to select an autonomous or semi-autonomous vehicle feature or system to engage based upon at least one of the occupant data, the external data, and/or the positional information. The autonomous or semi-autonomous vehicle technology may be related to at least one of braking, acceleration, deceleration, corning, steering, driver alertness monitoring, driver responsiveness monitoring, pedestrian detection, artificial intelligence, a back-up system, a navigation system, a positioning system, a security system, an anti-hacking measure, a theft prevention system, and remote vehicle location determination. The system may include additional, less, or alternate functionality, including that discussed elsewhere herein.

In another aspect, a computer-based method for detecting a vehicular collision and automatically engaging an autonomous vehicle feature may be provided. The method may be implemented on a vehicle computer device including one or more processors, sensors, and/or transceivers in communication with at least one memory device, the method comprising, via the one or more processors, sensors, and/or transceivers: (1) receiving occupant data from at least one internal sensor; (2) receiving external data from the at least one external sensor; (3) determining, by the vehicle computer device, that a potential vehicular collision is imminent based upon the received external data; and/or (4) automatically engaging an autonomous or semi-autonomous vehicle feature or system to prevent or mitigate damage caused by the vehicle collision. The method may include additional, less, or alternate actions, including those discussed elsewhere herein.

In another aspect, a computer-based method for detecting a vehicular collision and automatically engaging an autonomous vehicle feature may be provided. The method may be implemented on a vehicle computer device including one or more processors, sensors, and/or transceivers in communication with at least one memory device, the method comprising, via the one or more processors, sensors, and/or transceivers: receiving occupant data from at least one internal sensor; receiving external data from the at least one external sensor; determining, by the vehicle computer device, that a potential vehicular collision is imminent based upon the received external data; selecting, by the vehicle computer device, an autonomous feature to engage based upon the occupant data; and/or automatically engaging the autonomous feature, the autonomous feature including at least one of steering, breaking, and acceleration of the vehicle, to prevent or mitigate damage caused by the vehicle collision. The method may include additional, less, or alternate actions, including those discussed elsewhere herein.

In another aspect, a computer system configured to detect a vehicular collision and automatically engaging an autonomous vehicle feature may be provided. The system may include one or more processors, sensors, and/or transceivers in communication with at least one memory device, the one or more processors, sensors, and/or transceivers configured or programmed to: receive occupant data from at least one internal sensor; receive external data from the at least one external sensor; determine that a potential vehicular collision is imminent based upon the received external data; select an autonomous feature to engage based upon the occupant data; and/or automatically engage the autonomous feature, the autonomous feature including at least one of steering, breaking, and acceleration of the vehicle, to prevent or mitigate damage caused by the vehicle collision. The system may include additional, less, or alternate functionality, including that discussed elsewhere herein.

In another aspect, a computer system for detecting a vehicular collision and engaging an autonomous technology feature may be provided. The computer system may include one or more processors, sensors, and/or transceivers in communication with at least one memory device, the one or more processors, sensors, and/or transceivers configured or programmed to: receive occupant data from at least one internal sensor mounted on a vehicle and configured to collect data associated with the vehicle interior, the occupant data being generated or collected prior to a vehicle collision; receive external data from the at least one external sensor mounted on a vehicle and configured to collect data associated with the vehicle exterior, the external data being generated or collected prior to the vehicle collision; determine that a potential vehicular collision is imminent based upon the received external data; determine positional information for at least one occupant of a vehicle based upon the occupant data; and/or automatically engage an autonomous or semi-autonomous vehicle feature or system to mitigate at least one of vehicle damage and occupant injury caused by the vehicle collision, the autonomous or semi-autonomous vehicle feature or system being selected to engage (or an amount of feature or system engagement being) based upon the occupant data and/or positional information. The system may include additional, less, or alternate functionality, including that discussed elsewhere herein.

In another aspect, a computer-based method for detecting a vehicular collision and automatically engaging an autonomous vehicle feature may be provided. The method may be implemented on a vehicle computer device including one or more processors, sensors, and/or transceivers in communication with at least one memory device, the method comprising, via the one or more processors, sensors, and/or transceivers: receiving occupant data from at least one internal sensor mounted on the vehicle and configured to collect or generate data associated with the vehicle interior; receiving external data from the at least one external sensor mounted on the vehicle and configured to collect or generate data associated with the vehicle exterior; determining, by the vehicle computer device, that a potential vehicular collision is imminent based upon the received external data; and/or automatically engaging an autonomous or semi-autonomous vehicle feature or system to prevent or mitigate damage caused by the vehicle collision, the selection of the autonomous or semi-autonomous vehicle feature or system to engage, and/or an amount to engage the autonomous or semi-autonomous vehicle feature or system (or an autonomous or semi-autonomous vehicle feature or system setting) is based upon the occupant data. The method may include additional, less, or alternate actions, including those discussed elsewhere herein.

Additional Considerations

The present embodiments may facilitate avoiding vehicle collisions, or otherwise mitigating damage and injuries caused by vehicle collisions. Thus, vehicles configured with the functionality and computer systems may have a lower level of risk than conventional vehicles. Therefore, lower insurance premiums and/or insurance discounts may be generated and provided to insured's owning vehicles configured with the functionality and/or computer systems discussed herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A computer system for reconstructing a vehicle collision, the computer system comprising at least one processor in communication with at least one memory device, the at least one processor is programmed to:
   receive internal data from at least one internal sensor of a vehicle, the internal data including data from at least one of before, during, and after the vehicle collision;
   receive external data from at least one external sensor, the external data including data from at least one of before, during, and after the vehicle collision;
   determine positional information for at least one occupant of a vehicle at least one of before, during, and after the vehicle collision based upon the internal data;
   generate a virtual reconstruction of the vehicle collision, the virtual reconstruction indicating a severity of vehicle damage and a severity of injury to the at least one occupant caused by the vehicle collision; and
   automatically engage an autonomous or semi-autonomous vehicle system to mitigate damage caused by the vehicle collision.

2. The computer system of claim 1, wherein the processor is further programmed to determine the severity of vehicle damage and the severity of injury to the at least one occupant caused by the vehicle collision based upon at least one of the internal data, the external data, and the positional information for the at least one occupant of the vehicle.

3. The computer system of claim 1, wherein the processor is further programmed to determine a position and a direction of facing of the at least one occupant of the vehicle at least one of before, during, and after the vehicle collision based upon the internal data.

4. The computer system of claim 1, wherein the processor is further programmed to determine occupant skeletal positioning for the at least one occupant at least one of before, during, and after the vehicle collision based upon the internal data.

5. The computer system of claim 1, wherein the processor is further programmed to determine a size of the at least one occupant based upon the internal data.

6. The computer system of claim 1, wherein the autonomous or semi-autonomous vehicle system is related to at least one of driver alertness monitoring, driver responsiveness monitoring, pedestrian detection, artificial intelligence, a back-up system, a navigation system, a positioning system, a security system, an anti-hacking measure, a theft prevention system, and remote vehicle location determination.

7. A computer-based method for reconstructing a vehicle collision, the method implemented on a vehicle computer device including at least one processor in communication with at least one memory device, the method comprising:
   receiving internal data from at least one internal sensor of the vehicle, the internal data including data from at least one of before, during, and after the vehicle collision;
   receiving external data from at least one external sensor, the external data including data from at least one of before, during, and after the vehicle collision;
   determining, by the vehicle computer device, positional information for at least one occupant of the vehicle at least one of before, during, and after the vehicle collision based upon the internal data;
   generating a virtual reconstruction of the vehicle collision, the virtual reconstruction indicating a severity of damage to the vehicle and a severity of injury to the at least one occupant caused by the vehicle collision; and
   automatically engaging an autonomous or semi-autonomous vehicle system to mitigate damage caused by the vehicle collision.

8. The method of claim 7, further comprising determining the severity of vehicle damage and the severity of injury to the at least one occupant caused by the vehicle collision based upon at least one of the internal data, the external data, and the positional information for the at least one occupant of the vehicle.

9. The method of claim 7, further comprising determining a position and a direction of facing of at least one occupant of the vehicle at least one of before, during, and after vehicle collision based upon the internal data.

10. The method of claim 7, further comprising determining occupant skeletal positioning for the at least one occupant at least one of before, during, and after the vehicle collision based upon the internal data.

11. The method of claim 7, further comprising determining a size of the at least one occupant based upon the internal data.

12. The method of claim 7, wherein the autonomous or semi-autonomous vehicle system is related to at least one of driver alertness monitoring, driver responsiveness monitoring, pedestrian detection, artificial intelligence, a back-up system, a navigation system, a positioning system, a security system, an anti-hacking measure, a theft prevention system, and remote vehicle location determination.

13. A non-transitory computer-readable storage medium having computer-executable instructions embodied thereon, wherein when executed by a processor coupled to at least memory device, the computer-executable instructions cause the processor to:
receive internal data from at least one internal sensor of the vehicle, the internal data including data from at least one of before, during, and after the vehicle collision;
receive external data from at least one external sensor, the external data including data from at least one of before, during, and after the vehicle collision;
determine positional information for at least one occupant of the vehicle at least one of before, during, and after the vehicle collision based upon the internal data;
generate a virtual reconstruction of the vehicle collision, the virtual reconstruction indicating a severity of vehicle damage and a severity of injury to the at least one occupant caused by the vehicle collision; and
automatically engage an autonomous or semi-autonomous vehicle system to mitigate damage caused by the vehicle collision.

14. The non-transitory computer-readable storage medium of claim 13, wherein the computer-executable instructions further cause the processor to determine the severity of vehicle damage and the severity of injury to the at least one occupant caused by the vehicle collision based upon at least one of the internal data, the external data, and the positional information for the at least one occupant of the vehicle.

15. The non-transitory computer-readable storage medium of claim 13, wherein the computer-executable instructions further cause the processor to determine a position and a direction of facing of the at least one occupant of the vehicle at least one of before, during, and after the vehicle collision based upon the internal data.

16. The non-transitory computer-readable storage medium of claim 13, wherein the computer-executable instructions further cause the processor to determine occupant skeletal positioning for the at least one occupant at least one of before, during, and after the vehicle collision based upon the internal data.

17. A computer system for reconstructing a vehicle collision, the computer system including at least one processor in communication with at least one memory device, the at least one processor is programmed to:
receive internal data from at least one internal sensor mounted on a vehicle, wherein the at least one internal sensor is configured to collect data internal to the vehicle, wherein the internal data includes data from at least one of before, during, and after the vehicle collision, and wherein the internal data is associated with the vehicle interior;
receive external data from at least one external sensor mounted on the vehicle, wherein the at least one external sensor is configured to collect data external to the vehicle, wherein the external data includes data from at least one of before, during, and after the vehicle collision, and wherein the external data is associated with the vehicle exterior;
determine positional information for at least one occupant of the vehicle at least one of before, during, and after the vehicle collision based upon the internal data;
generate a virtual reconstruction of the vehicle collision, the virtual reconstruction indicating a severity of vehicle damage and a severity of injury to the at least one occupant caused by the vehicle collision based upon computer analysis of at least one of (i) the internal data, (ii) the external data, and (iii) the positional information; and
automatically engage an autonomous or semi-autonomous vehicle system to mitigate damage caused by the vehicle collision.

18. A computer-based method for reconstructing a vehicle collision, the method implemented on a vehicle computer device including at least one processor in communication with at least one memory device, the method comprising:
receiving internal data from at least one internal sensor mounted on a vehicle, wherein the at least one internal sensor is configured to collect data internal to the vehicle, wherein the internal data includes data from at least one of before, during, and after the vehicle collision, and wherein the internal data is associated with the vehicle interior;
receiving external data from at least one external sensor mounted on the vehicle, wherein the at least one external sensor is configured to collect data external to the vehicle, wherein the external data includes data from at least one of before, during, and after the vehicle collision, and wherein the external data is associated with the vehicle exterior;
determining, by the vehicle computer device, positional information for at least one occupant of the vehicle at least one of before, during, and after the vehicle collision based upon the internal data;
generating a virtual reconstruction of the vehicle collision, the virtual reconstruction indicating a severity of vehicle damage and a severity of injury to the at least one occupant caused by the vehicle collision based upon computer analysis of at least one of (i) the internal data, (ii) the external data, and (iii) the positional information; and
automatically engaging an autonomous or semi-autonomous vehicle system to mitigate damage caused by the vehicle collision.

\* \* \* \* \*